US012802015B2

(12) United States Patent
Tanigawa et al.

(10) Patent No.: US 12,802,015 B2
(45) Date of Patent: Nov. 17, 2026

(54) WORK ESTIMATION METHOD, WORK ESTIMATION SYSTEM, AND RECORDING MEDIUM

(71) Applicant: Panasonic Intellectual Property Corporation of America, Torrance, CA (US)

(72) Inventors: Risako Tanigawa, Kanagawa (JP); Yasunori Ishii, Osaka (JP); Kazuki Kozuka, Osaka (JP); Tatsumi Nagashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 175 days.

(21) Appl. No.: 18/823,886

(22) Filed: Sep. 4, 2024

(65) Prior Publication Data

US 2024/0428172 A1 Dec. 26, 2024

Related U.S. Application Data

(63) Continuation of application No. PCT/JP2023/004177, filed on Feb. 8, 2023.

(30) Foreign Application Priority Data

Mar. 15, 2022 (JP) ................................ 2022-040603

(51) Int. Cl.
*G06Q 10/0639* (2023.01)
*G01S 15/89* (2006.01)
(Continued)

(52) U.S. Cl.
CPC ........ *G06Q 10/06393* (2013.01); *G01S 15/89* (2013.01); *G06V 10/761* (2022.01);
(Continued)

(58) Field of Classification Search
None
See application file for complete search history.

(56) References Cited

U.S. PATENT DOCUMENTS 5,752,054 A * 5/1998 Garber .................. G06Q 99/00
715/255
10,510,219 B1 * 12/2019 Zalewski ............ H02N 11/002
(Continued)

FOREIGN PATENT DOCUMENTS

JP 2006-148842 6/2006

OTHER PUBLICATIONS

International Search Report (ISR) issued on Mar. 28, 2023 in International (PCT) Application No. PCT/JP2023/004177.

*Primary Examiner* — Jonathan D Armstrong
(74) *Attorney, Agent, or Firm* — Wenderoth, Lind & Ponack, L.L.P.

(57) ABSTRACT

A work estimation method includes: obtaining first sound information related to a reflected sound that is a sound obtained by reflection of an emission sound in an inaudible frequency range, and second sound information related to a work sound generated by a work performed by a person; outputting image information that indicates a work area of the person by inputting the first sound information to a first trained model; outputting tool information that indicates a tool that is being used by the person, by inputting the second sound information to a second trained model; and outputting work information that indicates a content of the work, by inputting the image information and the tool information to a third trained model.

19 Claims, 22 Drawing Sheets

(51) Int. Cl.

| | |
|---|---|
| ***G06V 10/74*** | (2022.01) |
| ***G06V 20/52*** | (2022.01) |
| ***G10L 25/18*** | (2013.01) |
| ***G10L 25/21*** | (2013.01) |
| ***G10L 25/51*** | (2013.01) |

(52) U.S. Cl.
CPC .............. *G06V 20/52* (2022.01); *G10L 25/18* (2013.01); *G10L 25/21* (2013.01); *G10L 25/51* (2013.01)

(56) References Cited

U.S. PATENT DOCUMENTS

| | | | | |
|---|---|---|---|---|
| 11,187,378 | B2 * | 11/2021 | Stoppenbrink | B23Q 11/0082 |
| 11,756,326 | B2 * | 9/2023 | Green | G08B 5/22 340/565 |
| 12,526,538 | B2 * | 1/2026 | Ke | H04N 23/951 |
| 2002/0024675 | A1 * | 2/2002 | Foxlin | G06F 3/0421 356/620 |
| 2005/0177929 | A1 * | 8/2005 | Greenwald | A61B 5/11 73/865.9 |
| 2008/0205515 | A1 * | 8/2008 | Kalva | H04N 19/137 375/E7.126 |
| 2010/0241464 | A1 * | 9/2010 | Amigo | A61B 5/6804 705/4 |
| 2014/0266693 | A1 * | 9/2014 | Moulton | G08B 21/043 340/539.12 |
| 2019/0011898 | A1 * | 1/2019 | Saeki | G05B 19/404 |
| 2020/0118400 | A1 * | 4/2020 | Zalewski | H04W 76/14 |
| 2021/0019620 | A1 * | 1/2021 | Munoz Delgado | G06N 3/045 |
| 2021/0104006 | A1 * | 4/2021 | Green | G06T 1/0014 |
| 2022/0172061 | A1 * | 6/2022 | Willmott | G06N 3/084 |
| 2022/0292349 | A1 * | 9/2022 | Stoll | G06N 3/08 |
| 2023/0298315 | A1 * | 9/2023 | Sheikholeslami | G06T 5/60 707/737 |
| 2023/0421917 | A1 * | 12/2023 | Ke | H04N 23/951 |
| 2024/0112455 | A1 * | 4/2024 | He | G06V 10/761 |
| 2024/0144954 | A1 * | 5/2024 | Schorn | G10L 25/51 |

* cited by examiner

Example of first sound information Is1

Another example of first sound information Is1

Example of second sound information Is2

WORK ESTIMATION METHOD, WORK ESTIMATION SYSTEM, AND RECORDING MEDIUM

CROSS REFERENCE TO RELATED APPLICATIONS

This is a continuation application of PCT International Application No. PCT/JP2023/004177 filed on Feb. 8, 2023, designating the United States of America, which is based on and claims priority of Japanese Patent Application No. 2022-040603 filed on Mar. 15, 2022. The entire disclosures of the above-identified applications, including the specifications, drawings and claims are incorporated herein by reference in their entirety.

FIELD

The present disclosure relates to a work estimation method, a work estimation system, and a recording medium for estimating the content of work performed by a person.

BACKGROUND

Conventional surveillance systems are known which monitor the surroundings of a person. As an example of this type of surveillance system, Japanese Unexamined Patent Application Publication No. 2006-148842 discloses a wearable surveillance camera system that is hands-free and is capable of imaging an omnidirectional area as well as record surrounding sounds.

SUMMARY

Technical Problem

The present disclosure provides a work estimation method and the like that is capable of estimating the content of work performed by a person while protecting the privacy of people.

Solution to Problem

A work estimation method according to one aspect of the present disclosure is a work estimation method that estimates a content of a work performed by a person. The work estimation method includes: obtaining first sound information and second sound information, the first sound information being related to a reflected sound that is a sound obtained by reflection of an emission sound in an inaudible frequency range, the second sound information being related to a work sound generated by the work performed by the person; outputting image information that indicates a work area of the person, by inputting the first sound information obtained in the obtaining to a first trained model; outputting tool information that indicates a tool that is being used by the person, by inputting the second sound information obtained in the obtaining to a second trained model; and outputting work information that indicates the content of the work, by inputting, to a third trained model, the image information output in the outputting of the image information and the tool information output in the outputting of the tool information.

A work estimation system according to one aspect of the present disclosure is a work estimation system that estimates a content of a work performed by a person. The work estimation system includes: a sound information obtainer that obtains first sound information and second sound information, the first sound information being related to a reflected sound that is a sound obtained by reflection of an emission sound in an inaudible frequency range, the second sound information being related to a work sound generated by the work performed by the person; a work area estimator that outputs image information that indicates a work area of the person, by inputting the first sound information obtained by the sound information obtainer to a first trained model; a used tool estimator that outputs tool information that indicates a tool that is being used by the person, by inputting the second sound information obtained by the sound information obtainer to a second trained model; and a work content estimator that outputs work information that indicates the content of the work, by inputting, to a third trained model, the image information output by the work area estimator and the tool information output by the used tool estimator.

A recording medium according to one aspect of the present disclosure is a non-transitory computer-readable recording medium having recorded thereon a computer program for causing a computer to execute the work estimation method described above.

Some general and specific aspects according to the present disclosure may be implemented using a system, a method, an integrated circuit, a computer program, or a computer-readable recording medium such as a CD-ROM, or any combination of systems, methods, integrated circuits, computer programs, or computer-readable recording media.

Advantageous Effects

It is possible to estimate the content of work performed by a person while protecting the privacy of people.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
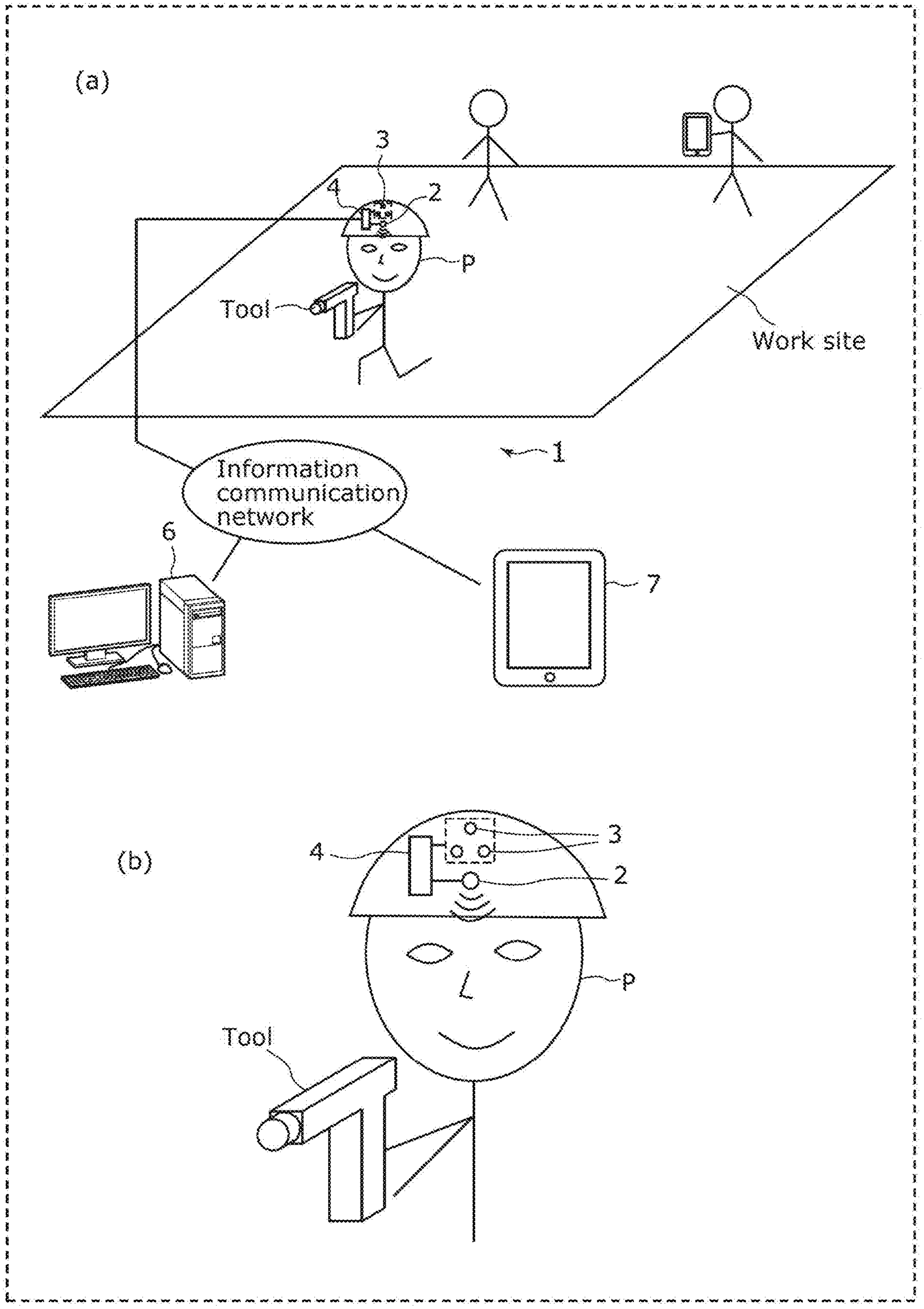
FIG. 1 illustrates a work estimation system according to Embodiment 1.

Nowadays, process and safety management at work sites is performed based on information captured by cameras. However, using a camera to capture images may cause privacy infringement issues. For example, when a camera is used to capture images, the camera may capture images of people or objects other than the capturing target, or the camera may record events as they are, which require privacy considerations. In addition, the camera may experience a decrease in sensing accuracy when there is a large change in ambient brightness. In order to solve the problems, the present disclosure provides a work estimation method, a work estimation system, and the like that are capable of estimating the content of work performed by a person while protecting the privacy of the people at the work site.

A work estimation method according to one aspect of the present disclosure is a work estimation method that estimates a content of a work performed by a person. The work estimation method includes: obtaining first sound information and second sound information, the first sound information being related to a reflected sound that is a sound obtained by reflection of an emission sound in an inaudible frequency range, the second sound information being related to a work sound generated by the work performed by the person; outputting image information that indicates a work area of the person, by inputting the first sound information obtained in the obtaining to a first trained model; outputting tool information that indicates a tool that is being used by the person, by inputting the second sound information obtained in the obtaining to a second trained model; and outputting work information that indicates the content of the work, by inputting, to a third trained model, the image information output in the outputting of the image information and the tool information output in the outputting of the tool information.

With the work estimation method, the content of work performed by a person is estimated based on the first sound information related to reflected sound that is sound obtained by reflection of emission sound in an inaudible frequency range, and second sound information related to work sound generated by the work performed by the person. Accordingly, it is possible to estimate the content of the work performed by the person while protecting the privacy of people.

Moreover, it may be that the first trained model is a model trained using sound information related to the reflected sound and an image that indicates the work area of the person, the second trained model is a model trained using sound information related to the work sound and tool information that indicates a tool that is possibly used in the work, and the third trained model is a model trained using the image information, the tool information, and work content that indicates the content of the work.

By using each trained model trained using the information above, the content of the work performed by the person can be appropriately estimated.

Moreover, it may be that the first sound information includes at least one of a signal waveform of a sound or an image that indicates an arrival direction of the sound, and the second sound information includes a spectrogram image that indicates a frequency and power of the sound.

With this, it is possible to easily obtain the first sound information and the second sound information. Accordingly, it is possible to easily estimate the content of the work performed by the person based on the first sound information and the second sound information.

Moreover, it may be that in the outputting of the work information, the image information input to the third trained model includes a plurality of image frames.

With this, it is possible to increase the amount of information of the image information to be input to the third trained model. This increases the accuracy of the work information to be output from the third trained model. Accordingly, it is possible to increase the accuracy of the estimation when the content of the work performed by the person is estimated.

Moreover, it may be that in the outputting of the work information, a total number of image frames to be input to the third trained model is determined based on a difference in a total number of pixels in the work area between two image frames among the plurality of image frames, the two image frames being preceding and successive image frames in analysis target frames.

With this, an appropriate data amount of image information can be input to the third trained model. Accordingly, an appropriate data amount is processed by the third trained model, leading to a reduction in the data processing amount required for estimating the content of the work performed by the person.

Moreover, it may be that the work estimation method further includes: selecting an image frame to be re-input to the third trained model from among the plurality of image frames, when the work information output in the outputting of the work information does not match any of the work information used when training the third trained model, in which, in the selecting, two or more image frames are selected, the two or more image frames having a difference in a total number of pixels in the work area between two image frames among the plurality of image frames, the difference being lower than a predetermined threshold value, the two image frames being preceding and successive image frames in analysis target frames, and in the outputting of the work information, the two or more image frames selected in the selecting are re-input to the third trained model to output the work information that is in accordance with the re-input.

With this, for example, even when an image frame input to the third trained model includes noise, work information of the person can be output excluding the image frame including noise. Accordingly, it is possible to increase the accuracy of the estimation when estimating the content of the work performed by the person.

Moreover, it may be that the work estimation method further includes: notifying the work information output in the outputting of the work information.

With this, it is possible to externally notify the work information of the person.

Moreover, it may be that the work estimation method further includes: displaying the work information notified in the notifying.

With this, the content of the work performed by the person can be visualized for notification.

Moreover, it may be that the outputting of the image information and the outputting of the tool information are executed when an output value of an acceleration sensor provided on a head of the person is lower than a predetermined threshold value.

With this, it is possible to reduce that noise is included in the first sound information. This reduces an incorrect estimation of the work area based on the first sound information. Accordingly, it is possible to reduce an incorrect estimation of the content of the work performed by the person.

Moreover, it may be that the work estimation method further includes: recording the work information output in the outputting of the work information, in which, in the recording, when an output value of an acceleration sensor provided on a head of the person is higher than or equal to a predetermined threshold value, a time period during which the output value is higher than or equal to the predetermined threshold value is recorded as a non-work period.

By recording the non-work period of the person in such a manner, it is possible to monitor the work state.

Moreover, it may be that the reflected sound is a sound reflected at a predetermined distance or less from a head of the person.

With this, it is possible to obtain the first sound information, for example, around the hand and arm area of the person. Accordingly, it is possible to reduce that unnecessary information is included in the first sound information, leading to an appropriate estimation of the work area based on the first sound information. This makes it possible to appropriately estimate the content of the work performed by the person.

Moreover, it may be that the outputting of the work information includes changing a weight applied to the image information to be input to the third trained model according to a rate of change in preceding and successive reflection waveforms in analysis target frames among reflection waveforms of the reflected sound included in the first sound information.

With this, for example, when a change in the first sound information is large, it is possible to reduce an incorrect estimation of the work area. Accordingly, it is possible to reduce an incorrect estimation of the content of the work performed by the person.

Moreover, it may be that the work estimation method includes: comparing reflection waveforms of the reflected sound included in the first sound information, in which, when it is determined in the comparing that a rate of change in preceding and successive reflection waveforms in analysis target frames is higher than or equal to a predetermined threshold value, the outputting of the work information includes setting a weight applied to the image information to be input to the third trained model to be lower than a weight applied to the tool information.

With this, it is possible to reduce an incorrect estimation of the work area even when, for example, a member, such as a board that covers the hand of person, is present in front of the hand. Accordingly, it is possible to reduce an incorrect estimation of the content of the work performed by the person.

Moreover, it may be that the work estimation method includes: changing an emission frequency of the emission sound in the inaudible frequency range according to information that indicates whether the person has been performing a same work for a certain time period or information that indicates whether the person has stopped performing the work for a certain time period among the work information output in the outputting of the work information.

By changing the emission frequency of the emission sound in such a manner, it is possible to reduce the power consumption of the work estimation system that executes the work estimation method. Moreover, it is possible to reduce the data processing amount required for executing the work estimation method.

Moreover, it may be that the work estimation method includes: outputting control information to an emission device that emits the emission sound in the inaudible frequency range, when it is determined based on the work information that the person has been performing the same work for the certain time period or the person has stopped performing the work for the certain time period, the control information being for reducing the emission frequency of the emission sound.

By outputting the control information for reducing the emission frequency of the emission sound in such a manner, it is possible to reduce the power consumption of the emission device. Moreover, it is possible to reduce the data processing amount required for executing the work estimation method.

Moreover, it may be that the work estimation method includes: providing a notification that prompts the person to rest, when it is determined based on the work information that the person has been performing a same work beyond a predetermined time period.

With this, it is possible to manage the heath of the person.

A work estimation system according to one aspect of the present disclosure is a work estimation system that estimates a content of a work performed by a person. The work estimation system includes: a sound information obtainer that obtains first sound information and second sound information, the first sound information being related to a reflected sound that is a sound obtained by reflection of an emission sound in an inaudible frequency range, the second sound information being related to a work sound generated by the work performed by the person; a work area estimator that outputs image information that indicates a work area of the person, by inputting the first sound information obtained by the sound information obtainer to a first trained model; a used tool estimator that outputs tool information that indicates a tool that is being used by the person, by inputting the second sound information obtained by the sound information obtainer to a second trained model; and a work content estimator that outputs work information that indicates the content of the work, by inputting, to a third trained model, the image information output by the work area estimator and the tool information output by the used tool estimator.

With the work estimation system, the content of work performed by a person is estimated based on the first sound information related to reflected sound that is sound obtained by reflection of emission sound in an inaudible frequency range, and second sound information related to work sound generated by the work performed by the person. Accordingly, it is possible to estimate the content of the work performed by the person while protecting the privacy of people.

Moreover, it may be that the work estimation system further includes: an ultrasonic emitter that emits the emission sound; and a microphone that receives the reflected sound.

With such a configuration, the sound information obtainer is capable of easily obtaining the first sound information and the second sound information. Accordingly, it is possible to easily output image information that indicates the work area based on the first sound information, tool information based on the second sound information, and work information of the person based on the image information and the tool information. This facilitates estimation of the content of the work performed by the person.

A recording medium according to one aspect of the present disclosure is a non-transitory computer-readable recording medium having recorded thereon a computer program for causing a computer to execute the work estimation method described above.

With the recording medium, it is possible to provide a work estimation method that estimates the content of the work performed by the person while protecting the privacy of people.

Hereinafter, a work estimation method, a work estimation system, and the like according to one aspect of the present disclosure will be specifically described with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the present disclosure. Therefore, among the structural elements in the following exemplary embodiments, those not recited in any one of the independent claims defining the most generic part of the inventive concept are described as optional structural elements.

Embodiment 1

[Overall Configuration of Work Estimation System]

An overall configuration of a work estimation system according to Embodiment 1 will be described.

FIG. 1 illustrates work estimation system 1 according to Embodiment 1. In FIG. 1, (a) illustrates an overall view of work estimation system 1, and (b) illustrates person P at a work site and a tool that is being used by person P.

Work estimation system 1 according to Embodiment 1 is a system that estimates the content of the work being performed by person P, such as a worker, at a work site. The work site is, for example, a construction work site in which an interior, exterior, wiring, plumbing, assembly, building work, or the like is performed. The work site is not limited to the construction sites described above, but may also be manufacturing and logistics sites. By estimating the content of the work performed by person P, it is possible, for example, to watch over person P, manage the health of person P, or manage the progress of work.

Figure 2:
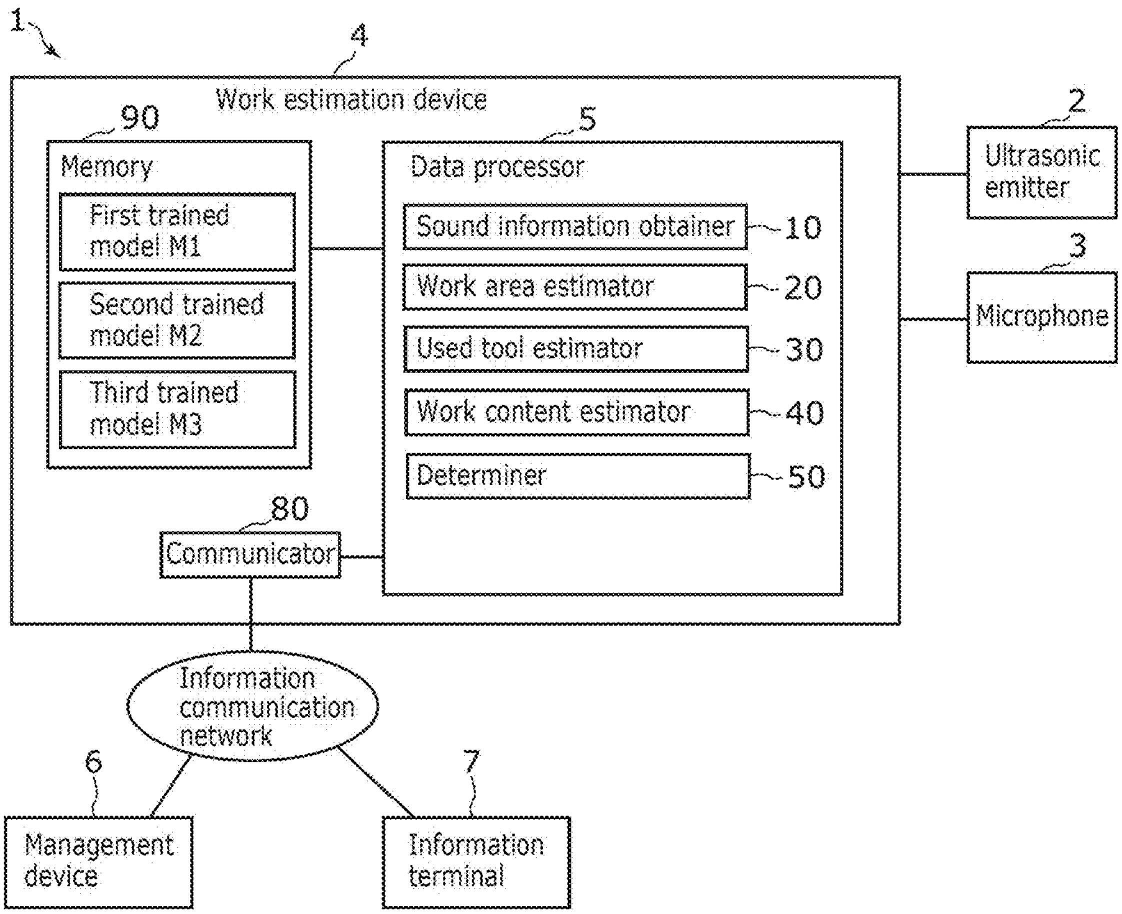
FIG. 2 is a block diagram illustrating a functional configuration of the work estimation system according to Embodiment 1 and a work estimation device included in the work estimation system.

FIG. 2 is a block diagram illustrating a functional configuration of work estimation system 1 and work estimation device 4 included in work estimation system 1.

Work estimation system 1 includes ultrasonic emitter 2, microphone 3, and work estimation device 4. Work estimation system 1 also includes management device 6 and information terminal 7.

Management device 6 is provided outside the work site, and is communicatively connected to work estimation device 4 via an information communication network. Management device 6 is a computer, for example, and is provided in the building of a management company that performs security management. Management device 6 is a device for checking the content of the work performed by person P. Management device 6 is notified of the work information and the like that indicates the content of the work performed by person P estimated by work estimation device 4.

Information terminal 7 is communicatively connected to work estimation device 4 via the information communication network. Information terminal 7 is, for example, a smartphone or tablet terminal that can be carried by person P. Various information obtained by work estimation device 4 is transmitted to information terminal 7. Information terminal 7 displays the various information transmitted from work estimation device 4. The owner of information terminal 7 may be person P himself or herself or the employer of person P, such as a worker.

Ultrasonic emitter 2 is an ultrasonic sonar that emits ultrasonic waves as emission sound. Ultrasonic emitter 2, for example, emits sound waves with a frequency of at least 20 kHz and at most 100 kHz. The signal waveforms of the sound emitted from ultrasonic emitter 2 may be burst or chirp waves. In the present embodiment, for example, burst wave sound with one cycle of 50 ms is continuously output from ultrasonic emitter 2.

Ultrasonic emitter 2 is provided on the head of person P via a helmet or a hat, for example, to emit ultrasound waves to the hand and arm area of person P. The emission sound from ultrasonic transmitter 2 is reflected by the hand and arm area of person P, and is collected by microphone 3 as reflected sound.

Microphone 3 is provided on the head of person P to receive (collect) the reflected sound. For example, microphone 3 is provided on a helmet or a hat on which ultrasonic emitter 2 is provided. Microphone 3 is, for example, a microphone array that includes three or more micro-electromechanical system (MEMS) microphones. When the number of microphones 3 is three, each microphone 3 is arranged at the position of each vertex of a triangle. In order to simplify the detection of reflected sound in the vertical and horizontal directions, four or more microphones 3 may be arranged along the vertical direction and another four or more microphones 3 may be arranged along the horizontal direction. Microphone 3 receives the reflected sound to generate a received sound signal, and outputs the received sound signal to work estimation device 4.

Since ultrasound waves are used for sensing in such a manner in the present embodiment, the outline of the hand or arm in the hand and arm area of person P can be detected. However, the face of a person and the like cannot be identified unlike a camera. This allows sensing that takes privacy into consideration to be performed. In addition, in the present embodiment, active sensing is performed which uses reflected sound that is sound reflected based on the emission of ultrasound waves. Hence, it is possible to sense the hand and arm area of person P even when person P has stopped talking or is working without making a sound. Therefore, it is possible to estimate the content of the work performed by person P even when person P is not making a sound.

[Overall Configuration of Work Estimation Device]

Work estimation device 4 illustrated in FIG. 2 is provided on the head of person P via a helmet or a hat. Work estimation device 4 does not have to be provided on a helmet or hat, but may be provided on clothing worn by person P.

Work estimation device 4 includes data processor 5, communicator 80, and memory 90. Data processor 5 includes sound information obtainer 10, work area estimator 20, used tool estimator 30, work content estimator 40, and determiner 50. Work estimation device 4 is configured from a computer that includes a processor and the like. Each of the structural elements of work estimation device 4 may be implemented by the software functions executed, for example, by a processor executing a program recorded in memory 90.

Memory 90 stores programs for data processing performed by data processor 5. In addition, memory 90 stores first trained model M1, second trained model M2, and third trained model M3 used for estimating the content of the work performed by person P.

Figure 3:
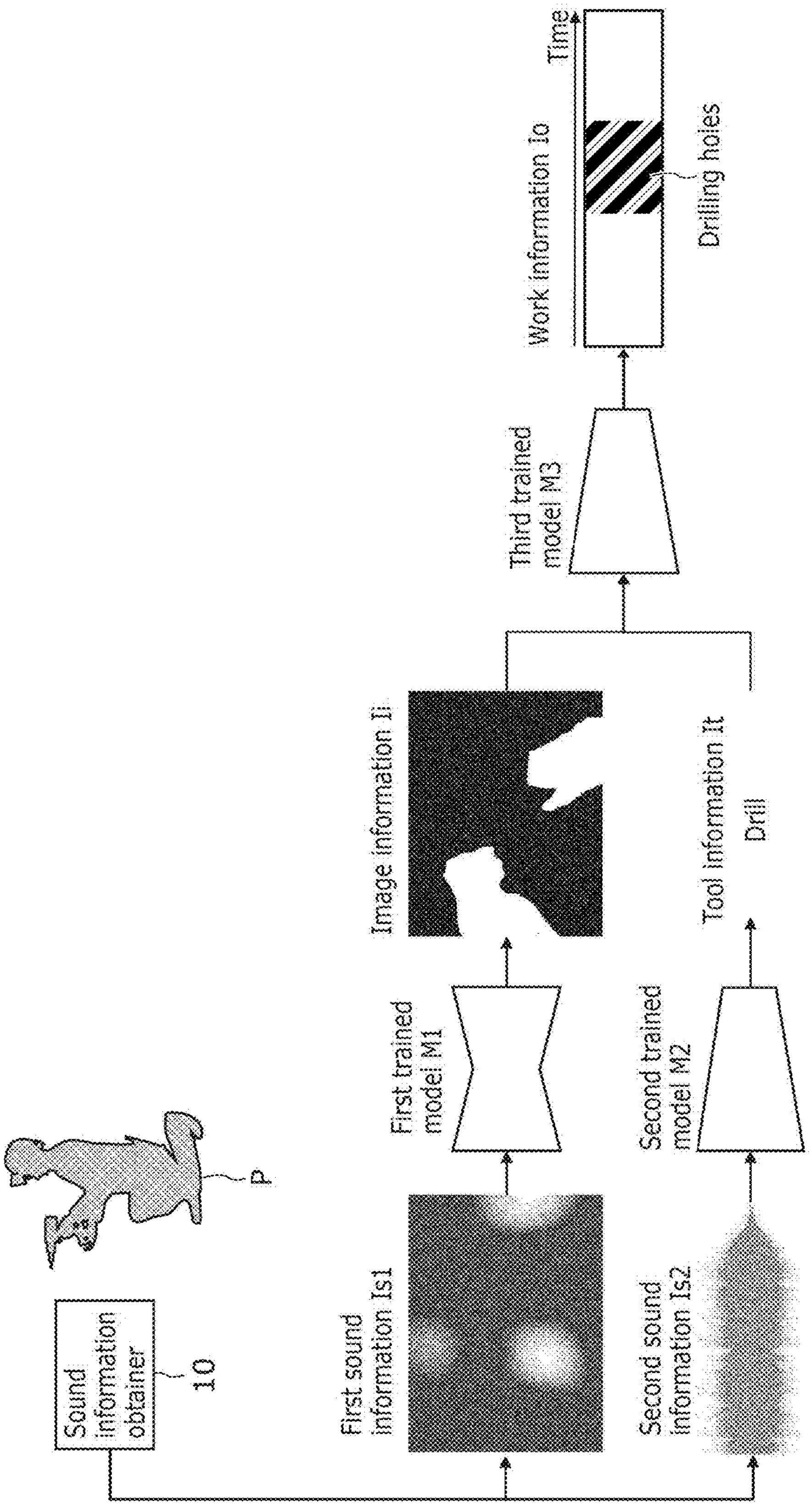
FIG. 3 illustrates inference models and the like used in the work estimation device according to Embodiment 1.

FIG. 3 illustrates inference models and the like used in work estimation device 4. FIG. 3 also illustrates input and output forms of the inference models.

As illustrated in FIG. 3, work estimation device 4 estimates the content of the work performed by person P with use of inference models that include first trained model M1, second trained model M2, and third trained model M3. Work estimation device 4 according to the present embodiment outputs image information Ii that indicates the work area that includes, for example, the hands or arms of person P, by inputting first sound information Is1 to first trained model M1. In addition, work estimation device 4 outputs tool information It that indicates the tool that is being used by person P, by inputting second sound information Is2 to second trained model M2. In addition, work estimation device 4 outputs work information Io that indicates the work content, by inputting image information Ii and tool information It to third trained model M3. Work information Io output from third trained model M3 is represented in time series data.

Each structural element of work estimation device 4 will be described below.

[Sound Information Obtainer]

Sound information obtainer 10 of work estimation device 4 obtains first sound information Is1 to be input to first trained model M1 and second sound information Is2 to be input to second trained model M2.

First sound information Is1 is information related to reflected sound that is sound obtained by reflection of emission sound in an inaudible frequency range. For example, sound information obtainer 10 performs various data processing on the received sound signal output from microphone 3 to generate first sound information Is1. Specifically, sound information obtainer 10 segments the received sound signal into the signal waveform for each one period for extraction. Sound information obtainer 10 also extracts a sound signal in the frequency range of the emission sound from the received sound signal. The sound in the frequency range of the emission sound is the frequency range of ultrasonic emitter 2 (at least 20 kHz and at most 100 kHz), and does not include an audible frequency range. The sound signal in the frequency range of the emission sound is extracted by filtering the received signal (removing the audible frequency range) using a high-pass filter or band-rejection filter.

In such a manner, in the present embodiment, information related to the sound in the inaudible frequency range is obtained by sound information obtainer 10. By obtaining information related to the sound in the inaudible frequency range, information related to the sound of people talking is not collected, allowing the privacy of the people at the work site to be protected.

Figure 4:
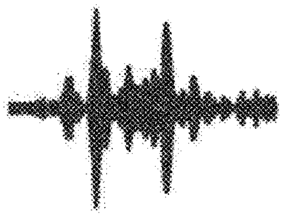
FIG. 4 illustrates an example of first sound information obtained by a sound information obtainer.

FIG. 4 illustrates an example of first sound information Is1 obtained by sound information obtainer 10.

FIG. 4 illustrates the signal waveform of burst waves. FIG. 4 illustrates the reflection waves of the sound reflected by the hand and arm area of person P relative to the emission sound from ultrasonic emitter 2. Time is represented on the horizontal axis of the signal waveform, and amplitude is represented on the vertical axis of the signal waveform.

Figure 5:
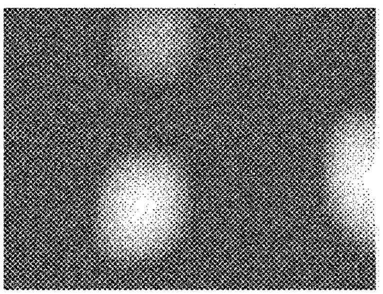
FIG. 5 illustrates another example of the first sound information obtained by the sound information obtainer.

FIG. 5 illustrates another example of first sound information Is1 obtained by sound information obtainer 10.

In FIG. 5, an image (sound image) that indicates the arrival direction of the reflected sound is represented in the shading of black and white. In FIG. 5, the white areas are areas with reflected sound, and the black areas are areas with no reflected sound. The image that indicates the arrival direction of the reflected sound is generated by performing delay-and-sum beamforming on the sound signal received using a plurality of microphones 3.

In the following, an example will be described in which an image that indicates the arrival direction of reflected sound is used as first sound information Is1. First sound information Is1 obtained by sound information obtainer 10 is output to work area estimator 20 which will be described later.

Second sound information Is2 obtained by sound information obtainer 10 is information related to work sound generated by the work performed by person P. The work sound includes the sound of the tool used at the work site. The tool sound may be, for example, sound made by a power tool such as a power drill, an impact driver, or a power saw, or sound made by a hand tool such as a saw, a hammer, a pipe cutter, or a scale. These tools make various work sounds according to the usage state of each tool.

Sound information obtainer 10 obtains second sound information Is2 related to the work sound other than the reflected sound. For example, sound information obtainer 10 performs various data processing on a received sound signal output from microphone 3 to generate second sound information Is2. The work sound does not include the reflected sound described above. Specifically, sound information obtainer 10 extracts, from the received sound signal, the signal related to the work sound while excluding the signals related to reflected sound and voice. The signal related to the work sound is extracted by filtering the received sound signal using a high-pass filter or a band-rejection filter.

In such a manner, in the present embodiment, information related to the work sound is obtained by sound information obtainer 10. Since the work sound does not include sound in the audible frequency range, information related to the sound of people talking is not collected, allowing the privacy of the people at the work site to be protected.

Figure 6:
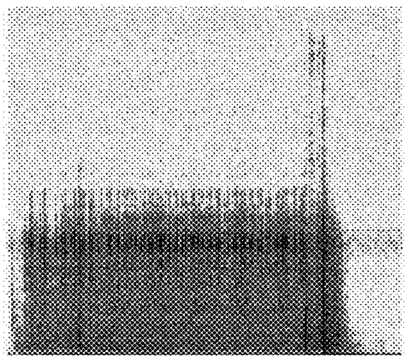
FIG. 6 illustrates an example of second sound information obtained by the sound information obtainer.

FIG. 6 illustrates an example of second sound information Is2 obtained by sound information obtainer 10.

FIG. 6 illustrates a spectrogram image that indicates the frequency (kHz) and power (dB/Hz) of sound. FIG. 6 illustrates, for example, sound information including the operating sound of a power drill. In FIG. 6, time is represented on the horizontal axis, and frequency is represented on the vertical axis. In FIG. 6, the power of the sound is represented in the shading of color, with the closer the color is to black, the higher the power. Second sound information Is2 is not limited to a spectrogram image, and may be a sound waveform as illustrated in FIG. 3. Second sound information Is2 obtained by sound information obtainer 10 is output to used tool estimator 30 which will be described later.

[Work Area Estimator]

Work area estimator 20 of work estimation device 4 estimates the work area in the hand and arm area of person P. Work area estimator 20 according to the present embodiment outputs image information Ii that indicates the work area, by inputting, to first trained model M1, first sound information Is1 output from sound information obtainer 10.

Figure 7:
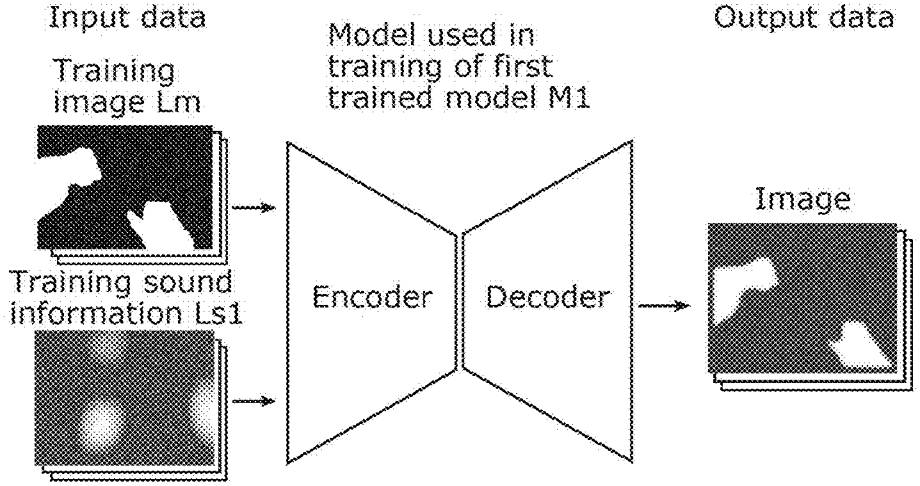
FIG. 7 illustrates a model, input data, and output data in training of a first trained model that is used by a work area estimator.

FIG. 7 illustrates a model, input data, and output data in training of first trained model M1 that is used by work area estimator 20.

First trained model M1 used by work area estimator 20 is a neural network model based on a variational autoencoder.

First trained model M1 is a model trained using training sound information Ls1 related to reflected sound that is sound obtained by reflection of emission sound in an inaudible frequency range and training images Lm each of which indicates a work area where hands or arms of person P are present. For example, an image that indicates the arrival direction of reflected sound is used as training sound information Ls1. As training image Lm, an image of the content of the work performed by a person other than person P previously captured by a camera is used. Training image Lm is a segmentation image in which the areas where the hands or arms are present are indicated in white, and the areas where the hands or arms are not present are indicated in black.

When generating first trained model M1, training is performed with training sound information Ls1 and training image Lm as input data, and an image with features similar to the two images as output data. In such a manner, first trained model M1 is generated by performing machine learning using training sound information Ls1 and training images Lm. First trained model M1, which has been previously generated, is stored in memory 90.

Work area estimator 20 outputs image information Ii that indicates the work area, by inputting first sound information Is1 obtained by sound information obtainer 10 to first trained model M1 generated as described above. Image information Ii is information that indicates the position, shape, and size of the hands or arms of person P. The area in the image where the hands or arms of person P occupies is represented by, for example, the brightness (luminance) of each pixel in the image.

Figure 8:
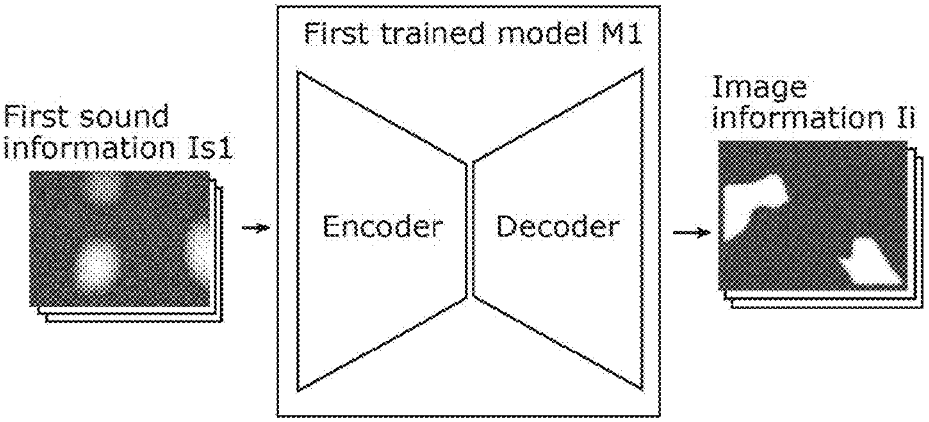
FIG. 8 illustrates an example of the first sound information input to the first trained model, and image information output from the first trained model in the work area estimator.

FIG. 8 illustrates an example of first sound information Is1 input to first trained model M1, and image information Ii output from first trained model M1 in work area estimator 20.

First sound information Is1 input to first trained model M1 is, for example, as illustrated in FIG. 8, an image that indicates the arrival direction of the reflected sound. First sound information Is1 is the same type of information as training sound information Ls1 in that position coordinates are used to indicate the arrival direction of the reflected sound.

Image information Ii output from first trained model M1 is an image that indicates the work area of person P, as illustrated in FIG. 8. In image information Ii, the areas where the hands or arms of person P are estimated to be present are indicated in white, and the areas where the hands or arms are estimated not to be present are indicated in black. Image information Ii is the same type of information as training image Lm in that it is an image that indicates a work area.

In such a manner, work area estimator 20 outputs image information Ii that indicates the work area based on first sound information Is1. Image information Ii output from work area estimator 20 is output to work content estimator 40 which will be described later.

[Used Tool Estimator]

Used tool estimator 30 of work estimation device 4 estimates the tool that is being used by person P. Used tool estimator 30 according to the present embodiment outputs tool information It that indicates the tool that is being used by person P, by inputting second sound information Is2 output from sound information obtainer 10 to second trained model M2.

Figure 9:
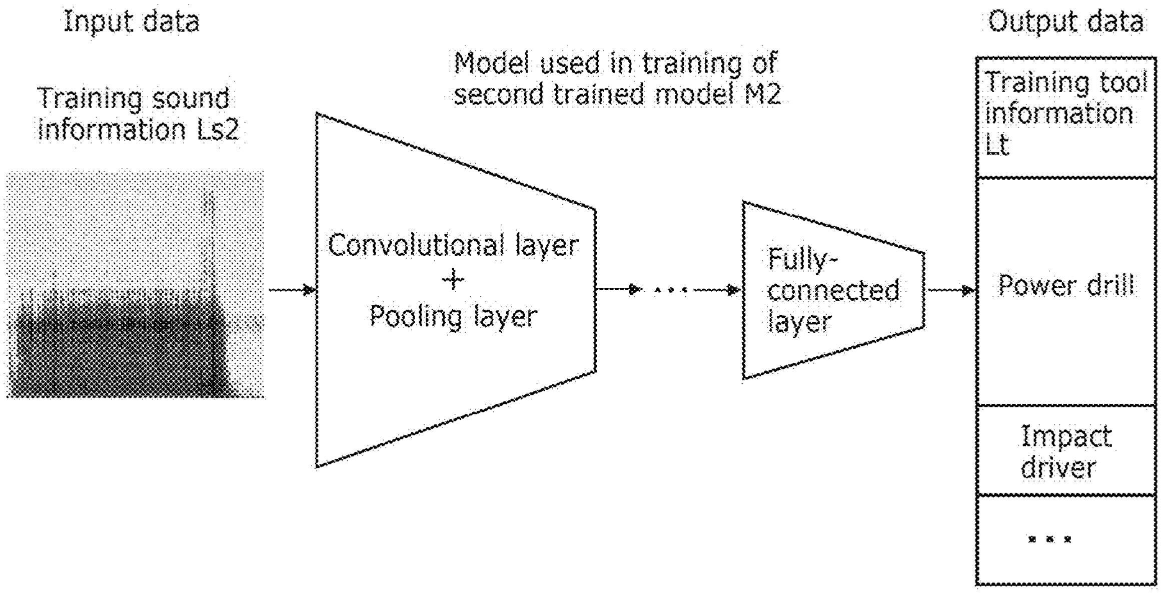
FIG. 9 illustrates a model, input data, and output data in training of a second trained model that is used by a used tool estimator.

FIG. 9 illustrates a model, input data, and output data in training of second trained model M2 that is used by used tool estimator 30.

Second trained model M2 used by used tool estimator 30 is a model that uses a convolutional neural network.

Second trained model M2 is trained using training sound information Ls2 related to work sound and training tool information Lt related to a tool that is possibly used by person P. As training sound information Ls2, a spectrogram image in which sound is converted into a short-term spectrogram is used. As training tool information Lt, information that indicates the tool that is possibly used by person P is used. Examples of the tool that is possibly used by person P include a power drill, an impact driver, a power saw, a hand saw, a hammer, a pipe cutter, and a scale.

When generating second trained model M2, training is performed with training sound information Ls2 as input data and training tool information Lt as output data. In such a manner, second trained model M2 is generated by performing machine learning using training sound information Ls2 and training tool information Lt. Second trained model M2 that has been previously generated is stored in memory 90.

Used tool estimator 30 outputs tool information It that indicates the tool that is being used by person P, by inputting second sound information Is2 obtained by sound information obtainer 10 to second trained model M2 generated as described above.

Figure 10:
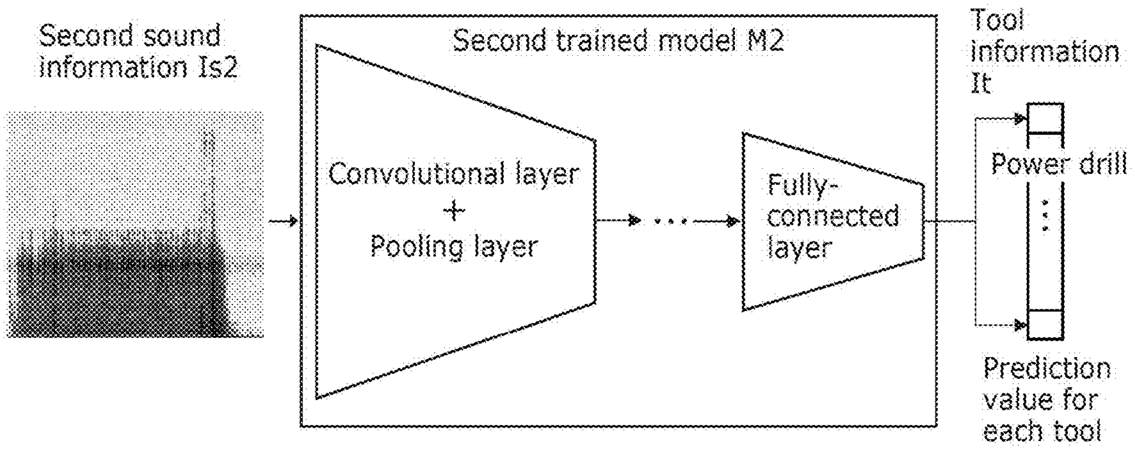
FIG. 10 illustrates an example of the second sound information input to the second trained model and tool information output from the second trained model in the used tool estimator.

FIG. 10 illustrates an example of second sound information Is2 input to second trained model M2 and tool information It output from second trained model M2 in used tool estimator 30.

Second sound information Is2 input to second trained model M2 is a spectrogram image, as illustrated in FIG. 10. Second sound information Is2 is the same type of information as training sound information Ls2 in that the work sound is represented in a frequency spectrogram.

Tool information It output from second trained model M2 is information that indicates the tool that is being used by person P, as illustrated in FIG. 10. Tool information It is the same type of information as training tool information Lt in that the tool that is being used by person P is represented in text.

In such a manner, used tool estimator 30 outputs tool information It that indicates the tool that is being used by person P, based on second sound information Is2. Tool information It output from used tool estimator 30 is output to work content estimator 40.

[Work Content Estimator]

Work content estimator 40 of work estimation device 4 estimates the content of work performed by person P. Work content estimator 40 according to the present embodiment outputs work information Io that indicates the content of the work performed by person P, by inputting, to second trained model M2, image information Ii output from work area estimator 20 and tool information It output from used tool estimator 30.

Figure 11:
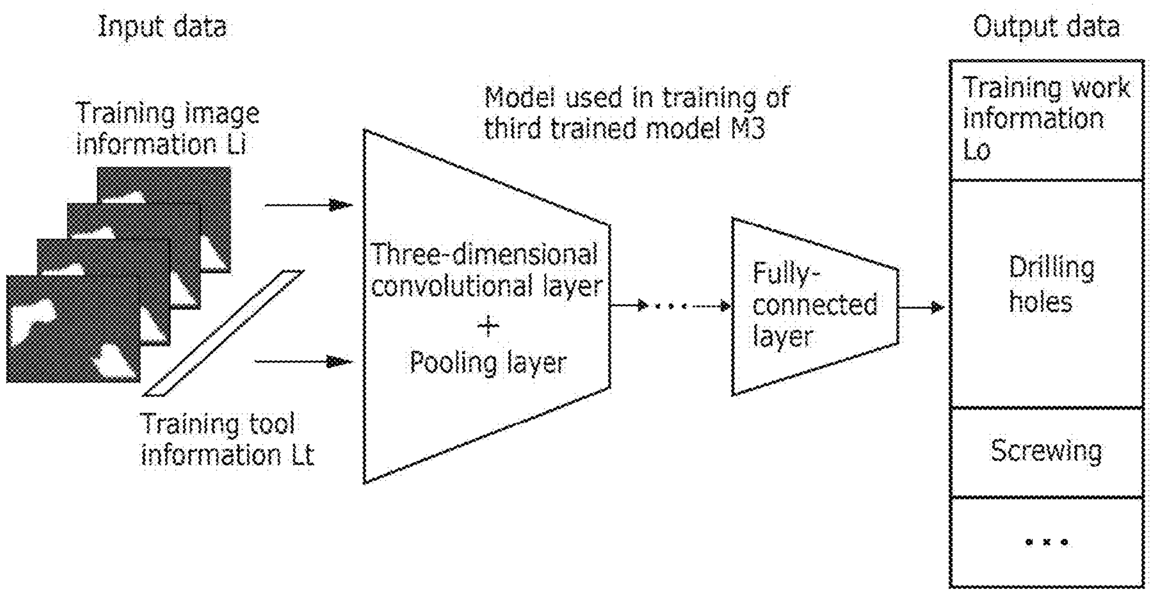
FIG. 11 illustrates a model, input data, and output data in training of a third trained model that is used by a work content estimator.

FIG. 11 illustrates a model, input data, and output data in training of third trained model M3 that is used in work content estimator 40.

Third trained model M3 used in work content estimator 40 is a model that uses a three-dimensional convolutional network.

Third trained model M3 is a model trained using training image information Li that indicates the work area of person P, training tool information Lt that indicates the tool that is possibly used by person P, and training work information Lo that indicates the content of work performed by person P. As training image information Li, image information Ii obtained by work area estimator 20 is used. For example, training image information Li is a video that includes a plurality of image frames. Training tool information Lt is the same as training tool information Lt used when training second trained model M2. Training work information Lo is information that indicates the content of work performed by person P using a tool. For example, training work information Lo is text information such as drilling holes, screwing, nailing, cutting, laying boards, or laying tiles.

When generating third trained model M3, training is performed with training image information Li and training tool information Lt as input data and training work information Lo as output data. In such a manner, third trained model M3 is generated by performing machine learning using training image information Li, training tool information Lt, and training work information Lo. Third trained model M3 that has been previously generated is stored in memory 90.

Work content estimator 40 outputs work information Io that indicates the content of the work performed by person P, by inputting image information Ii output from work area estimator 20 and tool information It output from used tool estimator 30 to third trained model M3 generated as described above.

Figure 12:
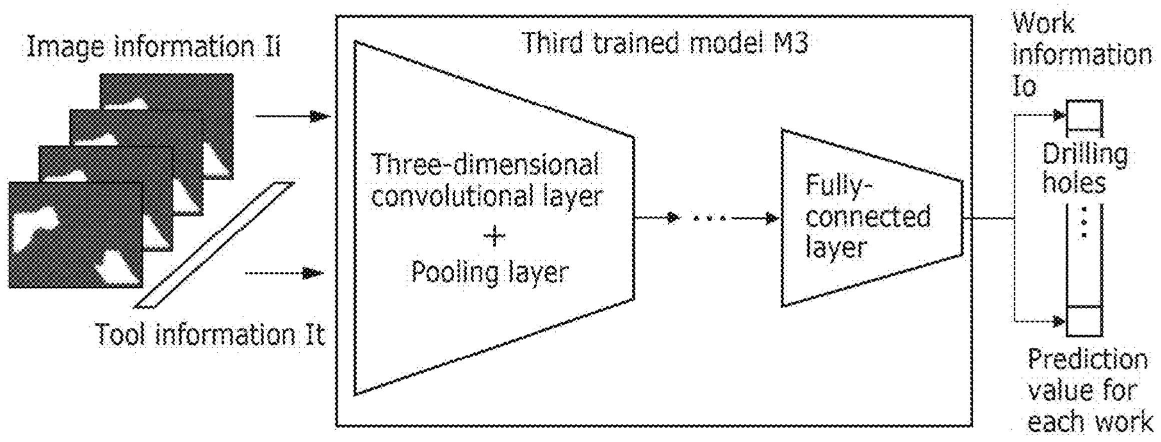
FIG. 12 illustrates an example of image information and tool information input to the third trained model, and work information output from the third trained model in the work content estimator.

FIG. 12 illustrates an example of image information Ii and tool information It input to third trained model M3, and work information Io output from third trained model M3 in work content estimator 40.

Image information Ii input to third trained model M3 is image information Ii output from first trained model M1. Image information Ii is a moving image that includes a plurality of image frames. However, image information Ii is not limited to a moving image, but may be a still image that includes a single image frame. Image information Ii is the same type of information as training image information Li in that the work area is represented in an image.

Tool information It input to third trained model M3 is tool information It output from second trained model M2. Tool information It is the same type of information as training tool information Lt in that the tool is represented in text.

Image information Ii and tool information It input to third trained model M3 are information based on first sound information Is1 and second sound information Is2 obtained at the same time point by sound information obtainer 10, respectively. In other words, image information Ii is information obtained by inputting first sound information Is1 at a given time point to first trained model M1. Tool information It is information obtained by inputting second sound information Is2 at the same time point as the given time point to second trained model M2.

Work information Io output from third trained model M3 is information that indicates the content of the work performed by person P. Work information Io is the same type of information as training work information Lo in that the content of the work performed by person P is represented in text.

In such a manner, work content estimator 40 outputs work information Io that indicates the content of the work performed by person P based on image information Ii that indicates the work area of person P and tool information It that indicates the tool that is being used by person P. Work information Io output from work content estimator 40 is output to memory 90 and communicator 80.

[Determiner]

Determiner 50 makes various determinations based on work information Io output from work content estimator 40. The various determinations made by determiner 50 will be described later in variations and the like.

[Communicator]

Communicator 80 is a communication module, and is communicatively connected to management device 6 and information terminal 7 via the information communication network. The information communication network may be a wired communication network or may include a wireless communication network. Communicator 80 outputs image information Ii, tool information It, and work information Io generated in data processor 5 to management device 6 and information terminal 7. Work information Io generated in data processor 5 is stored in memory 90 as history.

Figure 13:
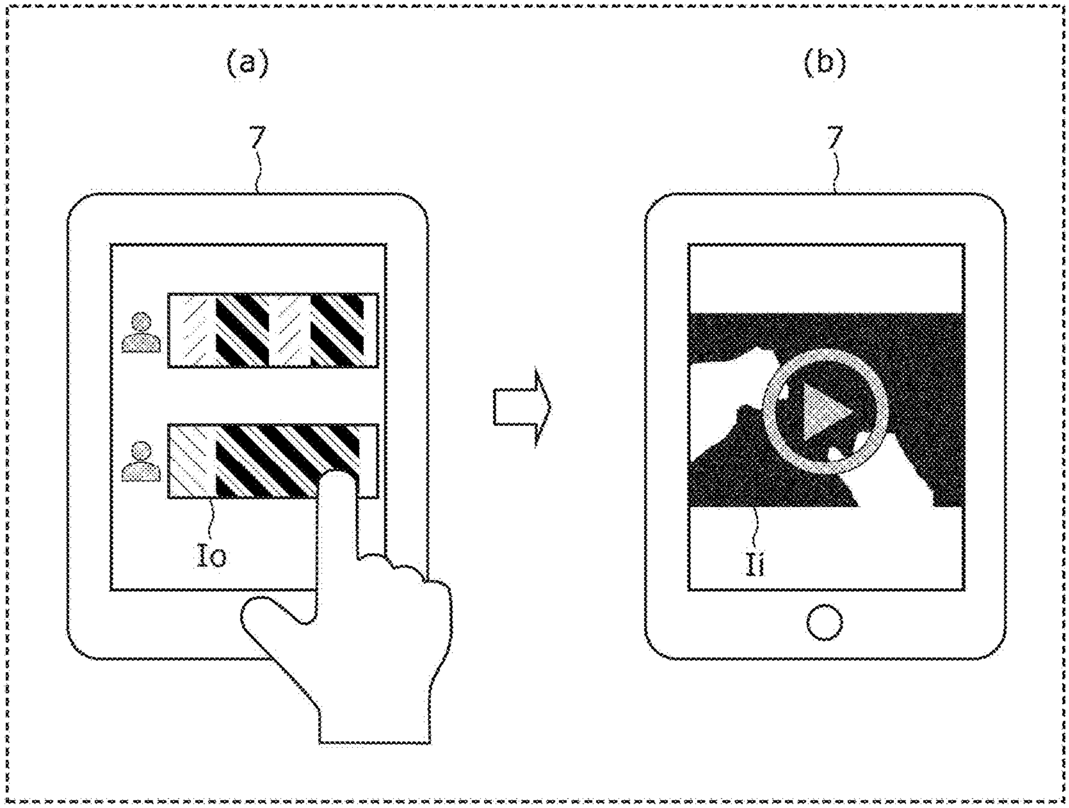
FIG. 13 illustrates an example of a screen displayed on an information terminal of the work estimation system.

FIG. 13 illustrates an example of a screen displayed on information terminal 7 of work estimation system 1.

Information terminal 7 reads out work information Io of person P from memory 90 via communicator 80. Information terminal 7 in (a) of FIG. 13 displays work information Io for each person P in chronological order. For example, when a selection input of predetermined work information Io displayed on the screen is received, image information Ii corresponding to work information Io is displayed as a moving image, as illustrated in (b) of FIG. 13. Display of work information Io on information terminal 7 in such a manner allows the owner of information terminal 7 to check work information Io of person P.

As described above, work estimation system 1 includes: work area estimator 20 that outputs image information Ii that indicates the work area of person P based on first sound information Is1 related to reflected sound that is sound obtained by reflection of emission sound in an inaudible frequency range; used tool estimator 30 that outputs tool information It that indicates the tool that is being used by person P based on second sound information Is2 related to work sound generated by the work performed by person P; and work content estimator 40 that outputs work information Io that indicates the content of the work performed by person P based on image information Ii and tool information It. Work estimation system 1 is capable of estimating the content of the work performed by person P while protecting the privacy of the people at the work site.

An example, in which the content of the work performed by a single person is estimated, has been described above, but the present disclosure is not limited to such an example. For example, when a plurality of persons are present, sound information related to the work sound generated by the work performed by the persons may be obtained, and the work content may be estimated based on the sound information.

[Work Estimation Method]

A work estimation method that estimates the content of the work performed by person P will be described.

Figure 14:
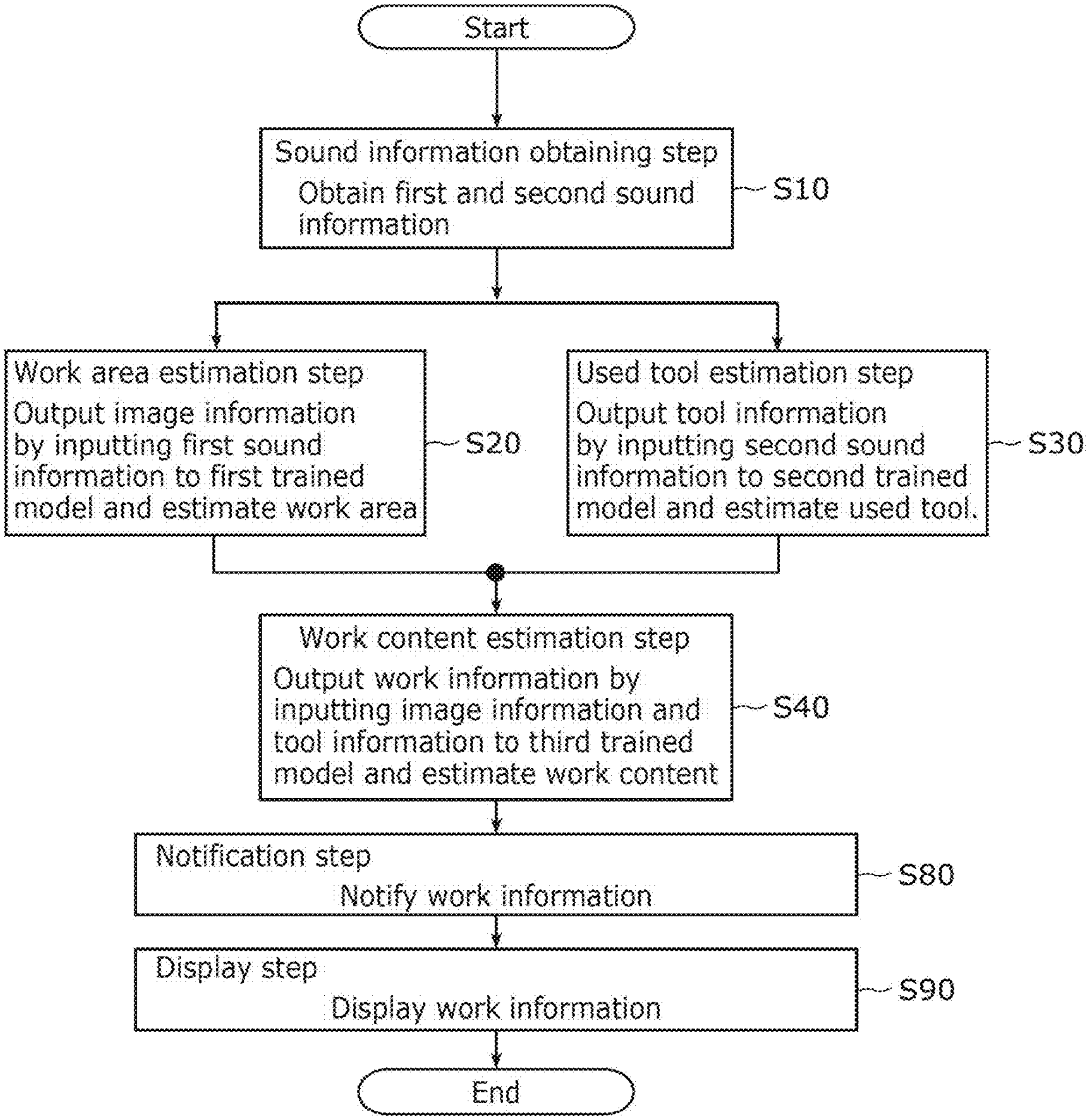
FIG. 14 is a flowchart of a work estimation method according to Embodiment 1.

FIG. 14 is a flowchart of a work estimation method according to Embodiment 1.

The work estimation method according to Embodiment 1 includes sound information obtaining step S10, work area estimation step S20, used tool estimation step S30, and work content estimation step S40. Sound information obtaining step S10, work area estimation step S20, used tool estimation step S30, and work content estimation step S40 are repeatedly executed during the working hours of person P. For example, it is desirable that work area estimation step S20 and used tool estimation step S30 are processed in parallel by a computer.

The work estimation method according to Embodiment 1 further includes notification step S80 and display step S90. Notification step S80 and display step S90 are executed as necessary. Each step will be described below.

In sound information obtaining step S10, ultrasound waves are emitted to the hand and arm area of person P by ultrasonic emitter 2, and the reflection sound that is sound reflected based on the emission sound of the ultrasound waves is received by microphone 3. Then, first sound information Is1 related to the reflected sound is obtained from the received sound. First sound information Is1 is information that includes at least one of a sound signal waveform as illustrated in FIG. 4 or an image that indicates the arrival direction of sound as illustrated in FIG. 5. First sound information Is1 is not limited to information obtained by imaging sound, and may be audio data.

In addition, in sound information obtaining step S10, the work sound at the work site is received by microphone 3. Then, second sound information Is2 related to the work sound is obtained from the received sound. Second sound information Is2 is information that includes a spectrogram image that indicates the frequency and power of the sound as illustrated in FIG. 6. Second sound information Is2 is not limited to information obtained by imaging sound, and may be audio data.

In work area estimation step S20, first sound information Is1 obtained in sound information obtaining step S10 is input to first trained model M1, and image information Ii that indicates the work area of person P is output from first trained model M1. In work area estimation step S20, the work area, which is the area where the hands or arms of person P are present, is estimated.

In used tool estimation step S30, second sound information Is2 obtained in sound information obtaining step S10 is input to second trained model M2, and tool information It that indicates the tool that is being used by person P is output from second trained model M2. Used tool estimation step S30 estimates the tool that is being used by person P.

In work content estimation step S40, image information Ii output in work area estimation step S20 and tool information It output in used tool estimation step S30 are input to third trained model M3, and work information Io that indicates the content of the work performed by person P is output from third trained model M3.

Image information Ii input to third trained model M3 includes a plurality of image frames. In work content estimation step S40, the total number of image frames is determined according to the speed of the movement of person P. For example, in work content estimation step S40, the total number of image frames to be input to third trained model M3 is determined based on the difference in the total number of pixels in the work area between two image frames among a plurality of image frames included in image information Ii. The two image frames are preceding and successive image frames in analysis target frames. The two image frames that are preceding and successive image frames in the analysis target frames are the image frames that are adjacent to each other when the plurality of image frames are arranged in chronological order.

Specifically, the total number of pixels in the work area in the first image frame is compared with the total number of pixels in the work area in the second image frame. When the difference in the total number of pixels is lower than a predetermined value, the time interval is increased. For example, inference is normally performed using ten image frames per second. However, when the difference in the total number of pixels is close to 0, inference is performed using five image frames per second. On the other hand, when the difference in the number of pixels is higher than the predetermined value, the time interval is decreased. For example, inference is normally performed using ten image frames per second. However, when the difference in the total number of pixels is large, inference is performed using twenty image frames per second. In the present embodiment, the content of the work performed by person P at the work site is estimated by such data processing performed by work content estimation step S40.

In notification step S80, work information Io estimated in work content estimation step S40 is output to management device 6 or information terminal 7. In addition, in notification step S80, work information Io that includes the past history may be output.

In display step S90, work information Io output in notification step S80 is displayed on information terminal 7.

The work estimation method according to the present embodiment includes: outputting image information Ii that indicates the work area of person P based on first sound information Is1 related to reflected sound that is sound obtained by reflection of emission sound in an inaudible frequency range; outputting tool information It that indicates the tool that is being used by person P based on second sound information Is2 related to work sound generated by the work performed by person P; and outputting work information Io that indicates the content of the work performed by person P based on image information Ii and tool information It. The work estimation method is capable of estimating the content of the work performed by person P while protecting the privacy of the people at the work site.

[Variation 1 of Embodiment 1]

Variation 1 of Embodiment 1 will be described. In Variation 1, an example of what is performed will be described in the cases where the image frames used in work content estimation step S40 include noise and the content of the work performed by person P cannot be accurately estimated.

Figure 15:
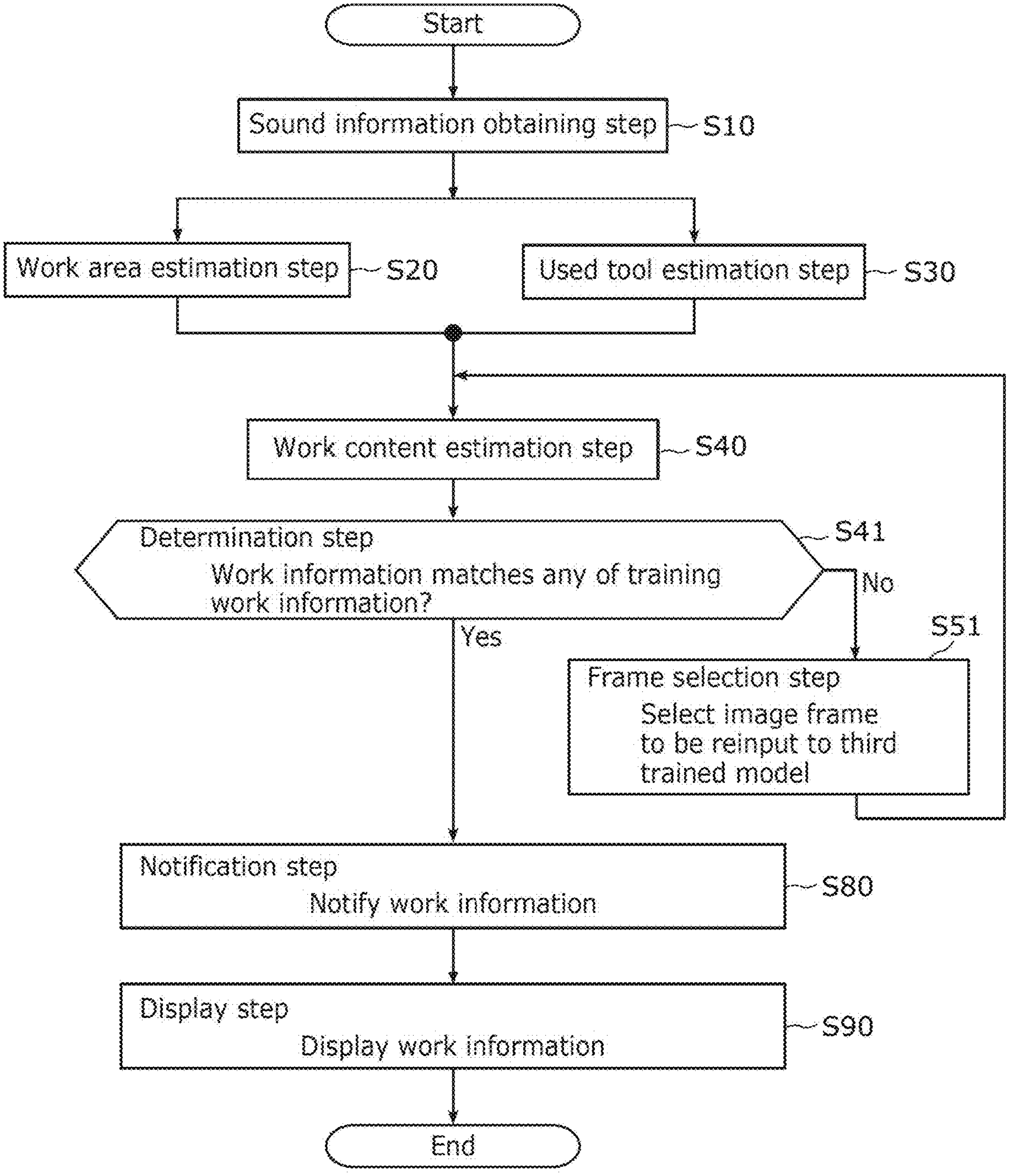
FIG. 15 is a flowchart of a work estimation method according to Variation 1 of Embodiment 1.

FIG. 15 is a flowchart of a work estimation method according to Variation 1 of Embodiment 1.

In a similar manner to Embodiment 1, the work estimation method according to Variation 1 includes sound information obtaining step S10, work area estimation step S20, used tool estimation step S30, work content estimation step S40, notification step S80, and display step S90. The work estimation method according to Variation 1 further includes determination step S41 and frame selection step S51 after work content estimation step S40.

In determination step S41, it is determined whether work information Io output in work content estimation step S40 matches any of training work information Lo used when training third trained model M3.

When work information Io matches any of training work information Lo (Yes in S41), it is determined that the content of the work performed by person P has been accurately estimated, and the process proceeds to next notification step S80. When work information Io does not match any of training work information Lo (No in S41), it is considered that the work of person P could not be estimated. A case where the content of the work performed by person P cannot be accurately estimated occurs, for example, when one or more image frames includes noise. In this case, the work performed by person P is estimated again excluding the image frames including noise. Specifically, when work information Io does not match any of training work information Lo, frame selection step S51 is executed.

In frame selection step S51, an image frame to be re-input to third trained model M3 is selected from among a plurality of image frames used in work content estimation step S40. For example, in frame selection step S51, two or more image frames are selected. The two or more frames are frames having a difference in the total number of pixels in the work areas between two image frames among a plurality of image frames. The difference is lower than a predetermined threshold value (first threshold value). The two image frames are preceding and successive image frames in analysis target frames. By selecting image frames with a difference in the total number of pixels that is lower than a predetermined threshold, it is possible to exclude image frames that have no continuity as image data, in other words, image frames that include noise.

In work content estimation step S40, the two or more image frames selected in frame selection step S51 are re-input to third trained model M3, and work information Io that is in accordance with the re-input is output.

In such a manner, even when the content of the work performed by person P cannot be accurately estimated, the content of the work performed by person P is estimated again excluding the image frames that caused the estimation failure, so that the content of the work performed by person P can be accurately estimated.

When many of the plurality of image frames include noise and there is no image frame to be selected, no image frame is re-input to third trained model M3, and the process returns to sound information obtaining step S10 and the next process is executed.

[Variation 2 of Embodiment 1]

Work estimation system 1A according to Variation 2 of Embodiment 1 will be described. For example, the intense movement of person P leads to unstable sensing using reflected sound, which may result in the obtained sound image that includes noise. In this case, it is not possible to correctly estimate the work area based on the sound image, making it difficult to estimate the work content. In view of the above, in the present variation, an example will be described in which it is determined whether to estimate the content of the work performed by person P based on the movement of the head of person P.

Figure 16:
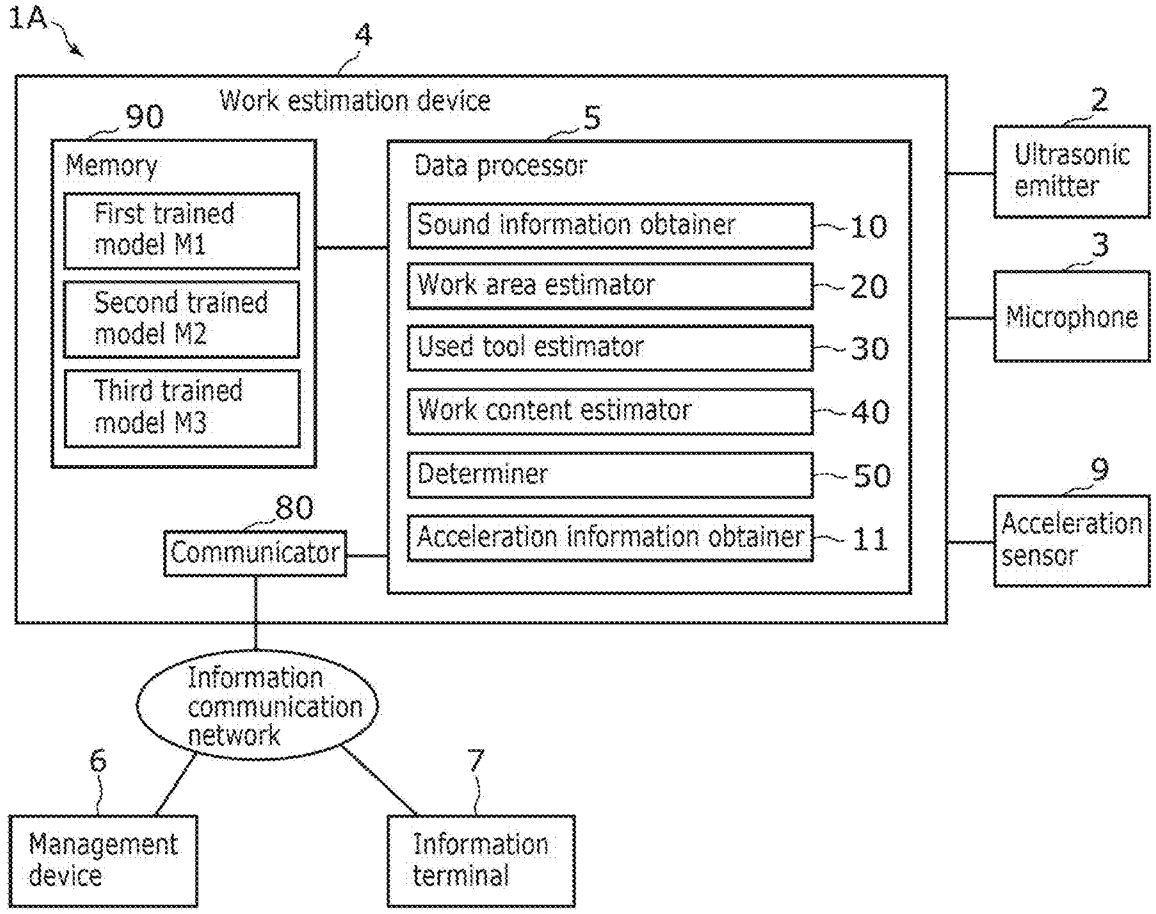
FIG. 16 is a block configuration diagram of a work estimation system according to Variation 2 of Embodiment 1.

FIG. 16 is a block configuration diagram of work estimation system 1A according to Variation 2 of Embodiment 1.

Work estimation system 1A according to Variation 2 includes ultrasonic emitter 2, microphone 3, work estimation device 4, management device 6, information terminal 7, and acceleration sensor 9.

Acceleration sensor 9 is provided on the head of person P, for example, via a helmet or a hat. Acceleration sensor 9 detects a change in speed when the head of person P moves. The detection signal obtained by acceleration sensor 9 is output to work estimation device 4.

Work estimation device 4 includes data processor 5, communicator 80, and memory 90. Data processor 5 includes sound information obtainer 10, work area estimator 20, used tool estimator 30, work content estimator 40, and determiner 50. Work estimation device 4 includes acceleration information obtainer 11.

Acceleration information obtainer 11 obtains the detection signal output from acceleration sensor 9.

Determiner 50 determines the intensity of the movement of the head of person P based on the detection signal output from acceleration sensor 9, and determines whether to estimate the content of the work performed by person P. For example, it is considered that when person P is performing work using a tool, his or her head movement will be small in order to focus on the work area, and when person P is not performing work using a tool, his or her head movement will be large. Therefore, when the output value of acceleration sensor 9 is lower than a predetermined threshold value (second threshold value), determiner 50 determines that person P is performing work, and determines to cause work estimation device 4 to estimate the work content. On the other hand, when the output value of acceleration sensor 9 is higher than or equal to the predetermined threshold value, determiner 50 determines that person P is not performing work, and determines not to cause work estimation device 4 to estimate the work content.

Figure 17:
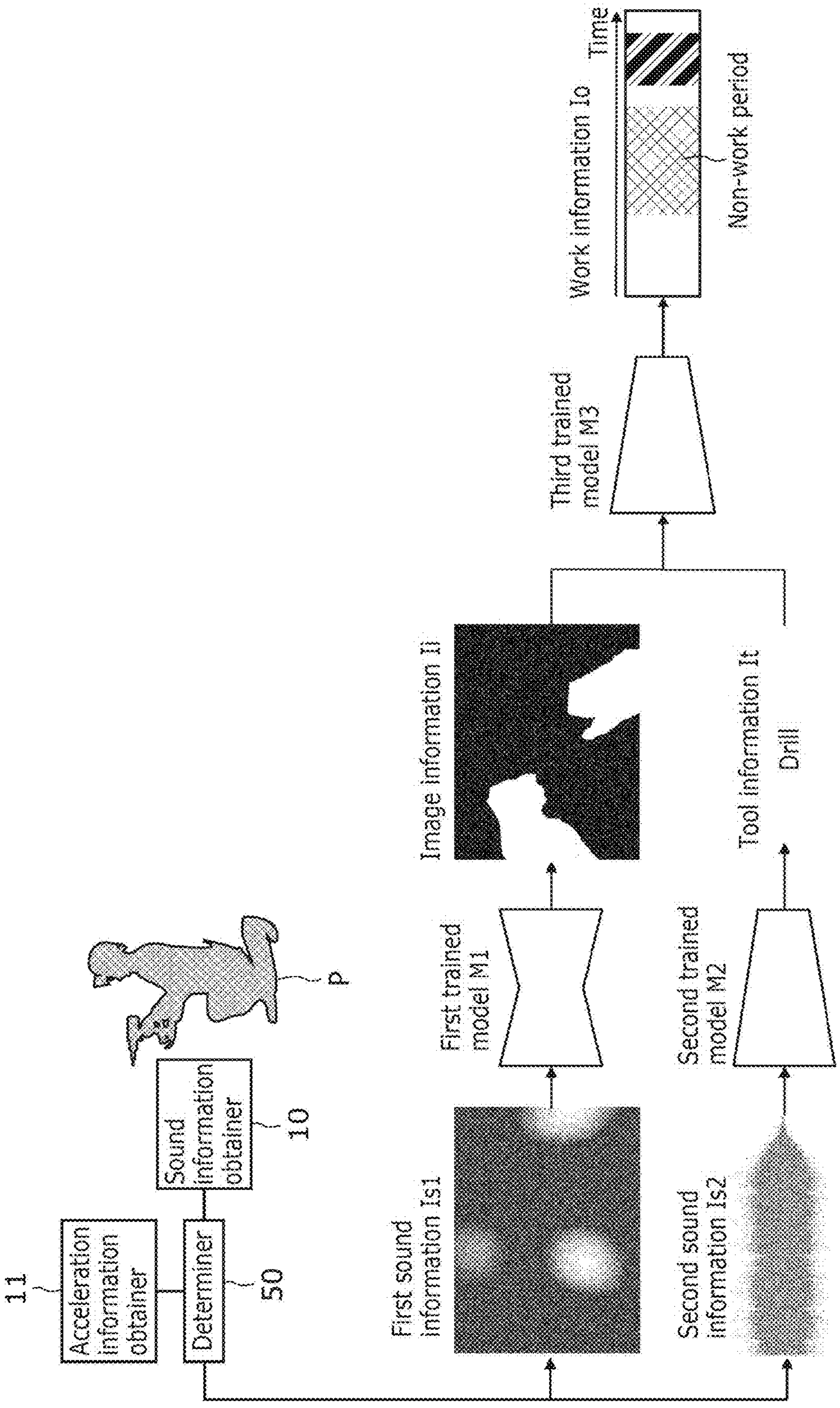
FIG. 17 illustrates inference models and the like used by a work estimation device according to Variation 2 of Embodiment 1.

FIG. 17 illustrates inference models and the like used by work estimation device 4 according to Variation 2 of Embodiment 1.

Work estimation device 4 according to Variation 2 outputs image information Ii by inputting first sound information Is1 to first trained model M1, when the output value of acceleration sensor 9 is lower than a predetermined threshold value. When the output value of acceleration sensor 9 is lower than the predetermined threshold value, work estimation device 4 according to Variation 2 also outputs tool information It that indicates a tool by inputting second sound information Is2 to second trained model M2. Work estimation device 4 then outputs work information Io that indicates the work content by inputting image information Ii and tool information It to third trained model M3.

Moreover, work estimation device 4 according to Variation 2 records a time period during which the output value of acceleration sensor 9 is higher than or equal to the predetermined threshold value as a non-work period during which person P is not performing work.

Figure 18:
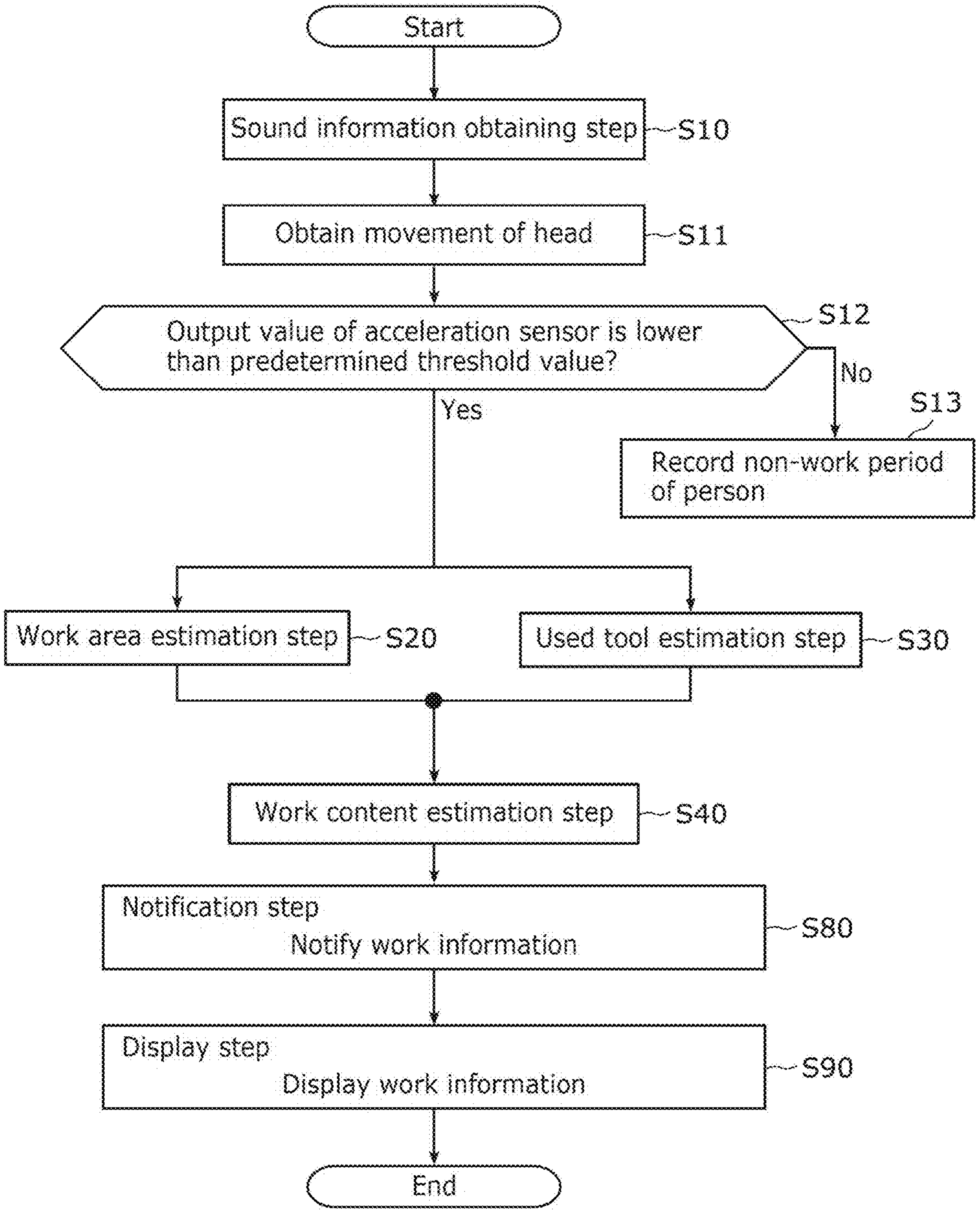
FIG. 18 is a flowchart of a work estimation method according to Variation 2 of Embodiment 1.

FIG. 18 is a flowchart of a work estimation method according to Variation 2 of Embodiment 1.

In a similar manner to Embodiment 1, the work estimation method according to Variation 2 includes sound information obtaining step S10, work area estimation step S20, used tool estimation step S30, and work content estimation step S40.

The work estimation method according to Variation 2 further includes a step of obtaining a movement of the head of person P, and a step of determining whether to estimate the content of the work performed by person P. The work estimation method according to Variation 2 further includes a step of recording work information Io output in work content estimation step S40.

In the work estimation method, first, in sound information obtaining step S10, first sound information Is1 and second sound information Is2 are obtained. First sound information Is1 and second sound information Is2 may be always obtained by sound information obtainer 10.

Next, acceleration information obtainer 11 obtains the movement of the head of person P (step S11). Specifically, the detection signal output from acceleration sensor 9 is obtained by acceleration information obtainer 11. Determiner 50 then determines whether to estimate the work content.

When the output value of acceleration sensor 9 is lower than the predetermined threshold value (Yes in S12), determiner 50 determines to cause work estimation device 4 to estimate the work content, and the process proceeds to steps S20 and S30. On the other hand, when the output value of acceleration sensor 9 is higher than or equal to the predetermined threshold value (No in S12), determiner 50 determines not to cause work estimation device 4 to estimate the work content, and records the time period during which the output value of acceleration sensor 9 is higher than or equal to the predetermined threshold value as a non-work period during which person P is not performing work (step S13).

In Variation 2, it is determined whether to estimate the content of the work performed by person P based on the movement of the head of person P. With this, it is possible to reduce that noise is included in first sound information Is1, and therefore it is possible to reduce an incorrect estimation of the work area based on first sound information Is1. This reduces an incorrect estimation of the content of the work performed by person P.

[Variation 3 of Embodiment 1]

Work estimation system 1 according to Variation 3 of Embodiment 1 will be described. For example, when obtaining sound information based on the reflected sound, sound reflected by an object other than the hands or arms may be obtained. In this case, it is not possible to correctly estimate the work area based on the sound information, making it difficult to estimate the work content. In view of the above, in the present variation, an example will be described in which the work area is estimated by analyzing reflected sound that is reflected at a predetermined distance or less.

In a similar manner to Embodiment 1, work estimation device 4 according to Variation 3 includes data processor 5, communicator 80, and memory 90. Data processor 5 includes sound information obtainer 10, work area estimator 20, used tool estimator 30, work content estimator 40, and determiner 50.

Sound information obtainer 10 according to Variation 3 extracts the sound reflected at a predetermined distance or less from the head of person P from among the reflected sounds received by microphone 3. For example, the reflected sound to be extracted is the sound reflected by an object (including the hands or arms of person P) that is present at a distance of 30 cm or less from ultrasonic emitter 2. With this, it possible to obtain sound information in the vicinity of the hand and arm area of person P, excluding the reflected waves from a wall and the like positioned farther than the hands or arms. Whether the reflected waves are sound reflected at a predetermined distance or less can be determined by the time difference between the direct waves and the reflected waves.

Figure 19:
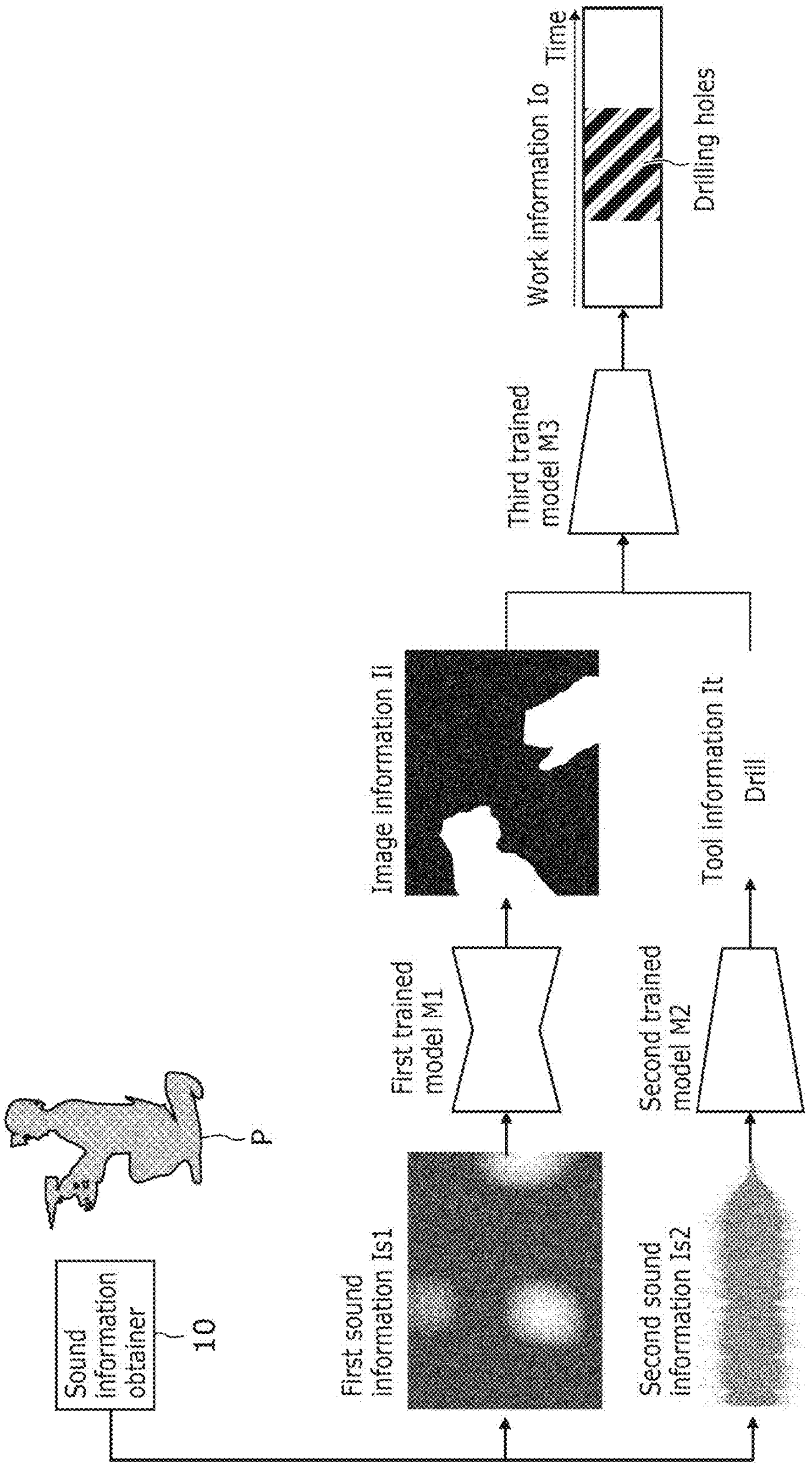
FIG. 19 illustrates inference models and the like used by a work estimation device according to Variation 3 of Embodiment 1.

FIG. 19 illustrates inference models and the like used by work estimation device 4 according to Variation 3 of Embodiment 1.

Work estimation device 4 outputs image information Ii by inputting first sound information Is1 to first trained model M1, outputs tool information It by inputting second sound information Is2 to second trained model M2, and outputs work information Io by inputting image information Ii and tool information It to third trained model M3.

In work estimation device 4, when first sound information Is1 is input to first trained model M1, sound reflected at a predetermined distance or less from the head of person P is input.

Figure 20:
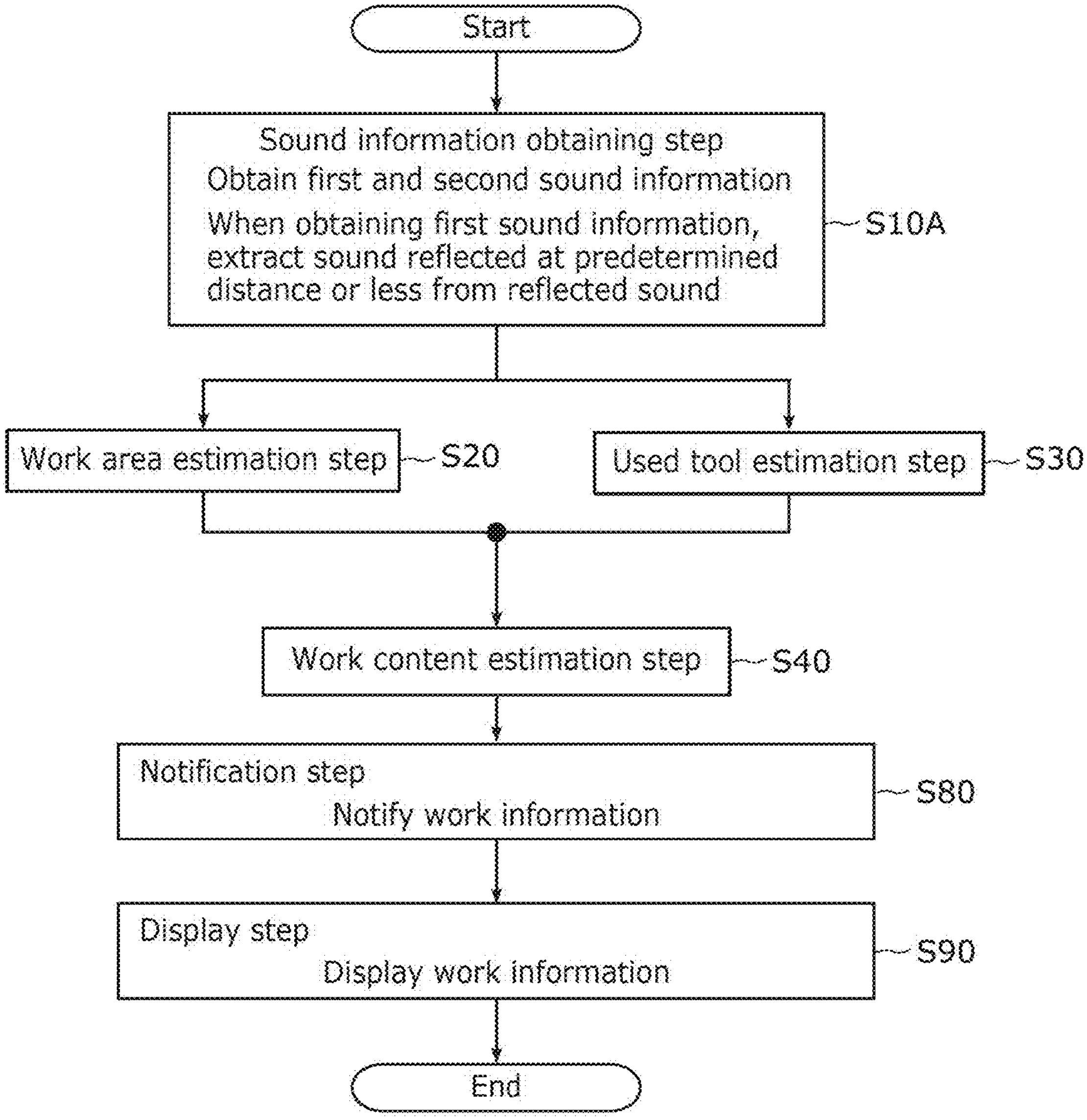
FIG. 20 is a flowchart of a work estimation method according to Variation 3 of Embodiment 1.

FIG. 20 is a flowchart of a work estimation method according to Variation 3 of Embodiment 1.

In a similar manner to Embodiment 1, the work estimation method according to Variation 3 includes work area estimation step S20, used tool estimation step S30, and work content estimation step S40. However, sound information obtaining step S10A is slightly different from that of Embodiment 1.

In Variation 3, when obtaining first sound information Is1 in sound information obtaining step S10A, the sound reflected at a predetermined distance or less from the head of person P is extracted from the reflected sound received by microphone 3. With this, it is possible to obtain sound information in the vicinity of the hand and arm area of person P, excluding the reflected waves from objects positioned farther than the predetermined distance. Therefore, it is possible to reduce that unnecessary information is included in first sound information Is1, and it is possible to appropriately estimate the work area based on first sound information Is1. This makes it possible to appropriately estimate the content of the work performed by person P.

[Variation 4 of Embodiment 1]

Work estimation system 1 according to Variation 4 of Embodiment 1 will be described. For example, when a board or the like that covers the hand and arm area of person P is present between the head of person P and the hand and arm area of person P, reflected sound may not be returned from the hand and arm area. In this case, it is not possible to correctly estimate the work area based on the sound information, making it difficult to estimate the work content. In view of the above, in Variation 4, an example will be described in which the method of estimating the content of the work performed by person P is changed according to a change in the reflection waveforms of the reflected sound.

In a similar manner to Embodiment 1, work estimation device 4 according to Variation 4 includes data processor 5, communicator 80, and memory 90. Data processor 5 includes sound information obtainer 10, work area estimator 20, used tool estimator 30, work content estimator 40, and determiner 50.

Determiner 50 according to Variation 4 changes the weight applied to image information Ii to be input to third trained model M3 according to a change in the preceding and successive reflection waveforms of the reflected sound in analysis target frames. The reflected sound is included in first sound information Is1. For example, when the rate of change in the reflection waveform is small, work is considered to be performed as usual, and when the rate of change in the reflection waveform is large, it is considered that the hand of person P has gone around the back side of a member such as a board. Therefore, determiner 50 changes the weight applied to image information Ii to be input to third trained model M3 according to the rate of change in the preceding and successive reflection waveforms in the analysis target frames.

Figure 21:
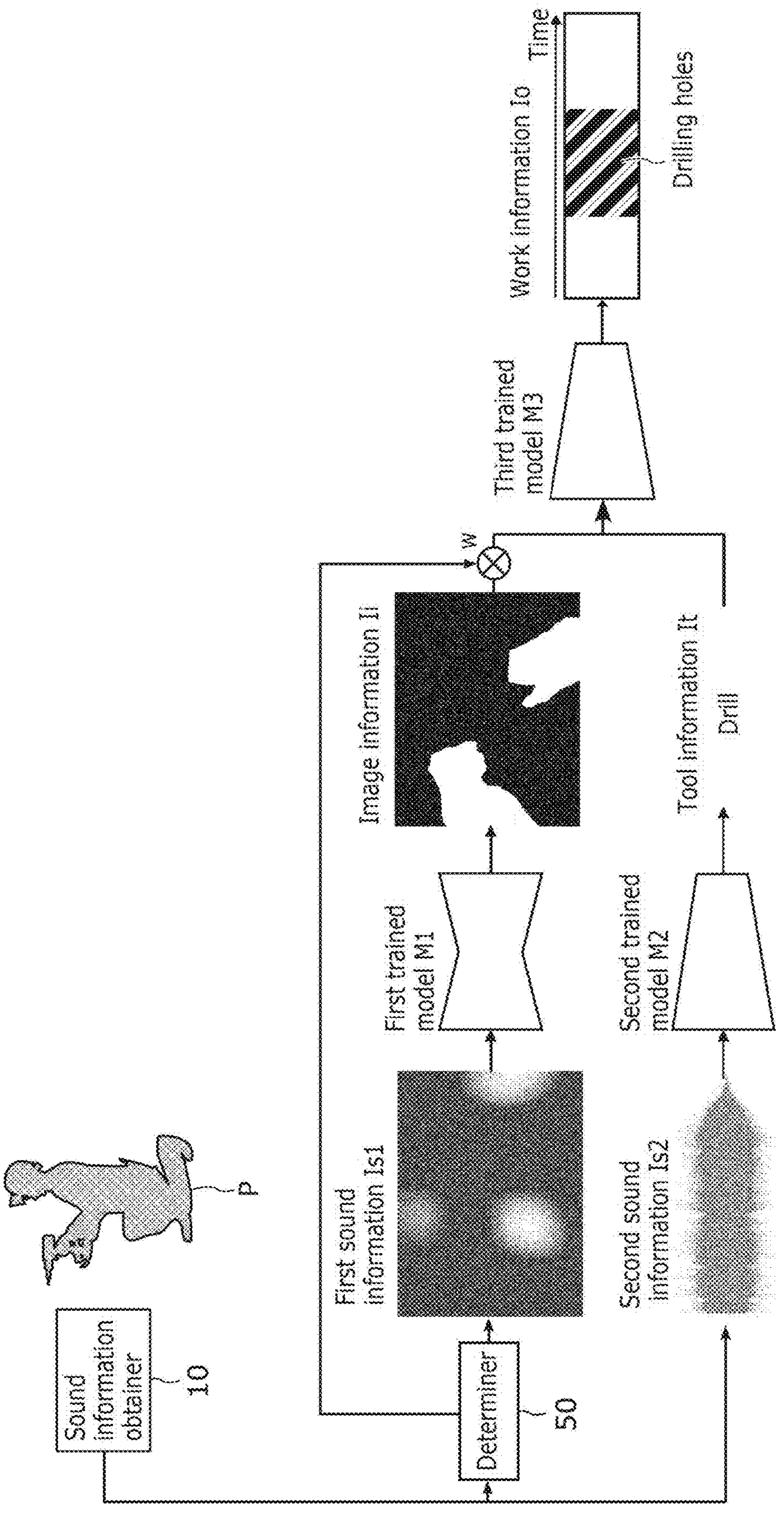
FIG. 21 illustrates inference models and the like used by a work estimation device according to Variation 4 of Embodiment 1.

FIG. 21 illustrates inference models and the like used by work estimation device 4 according to Variation 4 of Embodiment 1.

Work estimation device 4 outputs image information Ii by inputting first sound information Is1 to first trained model M1, outputs tool information It by inputting second sound information Is2 to second trained model M2, and outputs work information Io by inputting image information Ii and tool information It to third trained model M3.

In work estimation device 4, when inputting image information Ii to third trained model M3, the weight applied to image information Ii is changed according to the rate of change in the preceding and successive reflection waveforms in the analysis target frames (a rate of change from the reflection waveform at the preceding time point) among the reflection waveforms of the reflected sound. For example, when the rate of change in the preceding and successive reflection waveforms in the analysis target frames is higher than or equal to a predetermined threshold value (third threshold value), determiner 50 sets the weight applied to image information Ii to be input to third trained model M3 to be lower than the weight applied to tool information It.

Figure 22:
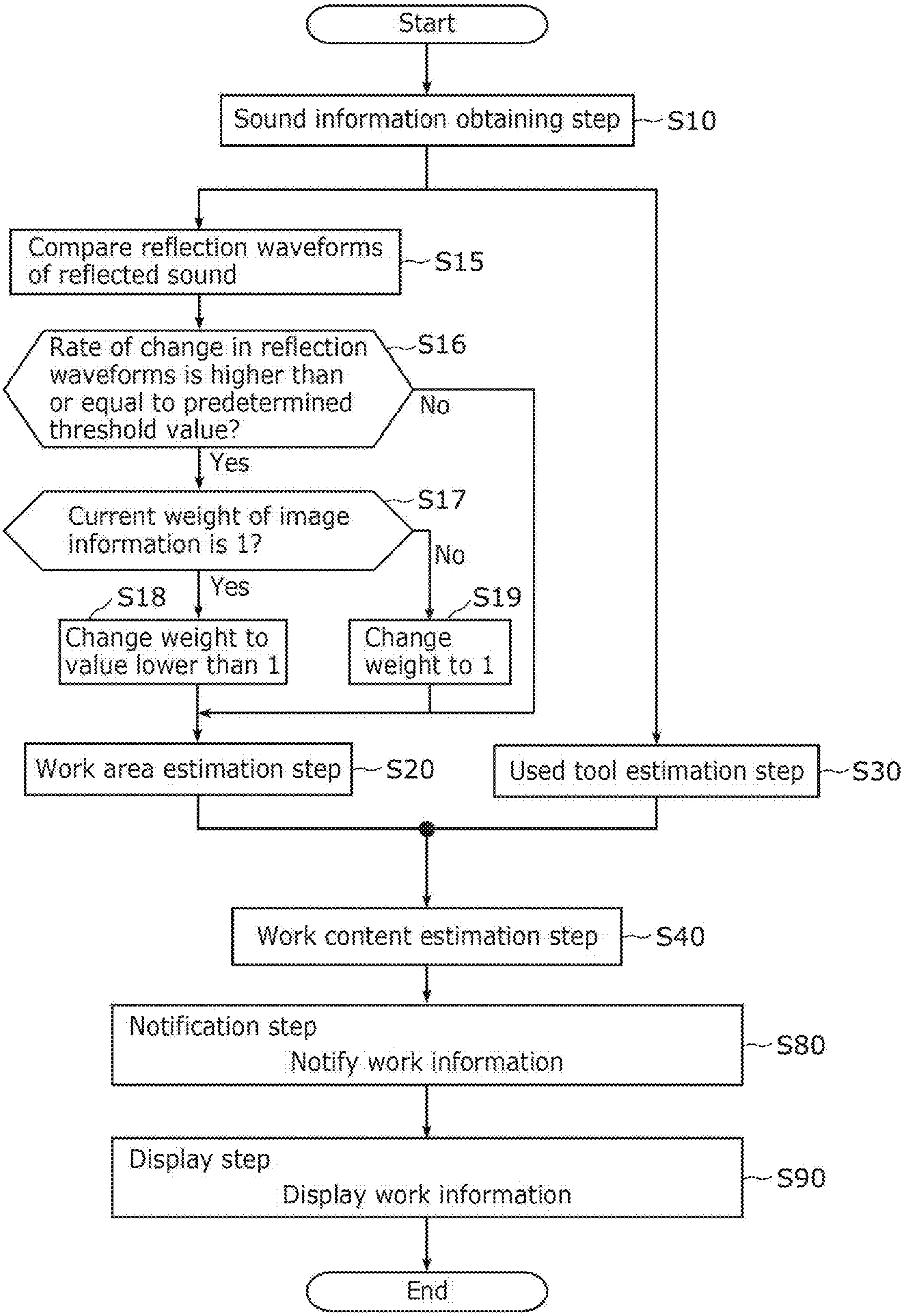
FIG. 22 is a flowchart of a work estimation method according to Variation 4 of Embodiment 1.

FIG. 22 is a flowchart of a work estimation method according to Variation 4 of Embodiment 1.

In a similar manner to Embodiment 1, the work estimation method according to Variation 4 includes sound information obtaining step S10, work area estimation step S20, used tool estimation step S30, and work content estimation step S40. The work estimation method further includes, for example, comparison step S15 in which the reflection waveforms of the reflected sound included in first sound information Is1 are compared, and a step of changing the weight applied to image information Ii.

In the work estimation method, first sound information Is1 and second sound information Is2 are first obtained in sound information obtaining step S10.

Next, determiner 50 compares the reflection waveforms of the reflected sound included in first sound information Is1 (step S15). Determiner 50 calculates the rate of change in the preceding and successive reflection waveforms in the analysis target frames among the reflected waveforms of the reflected sound. The rate of change in the reflection waveforms is obtained, for example, by the rate of change in the magnitude of the amplitude of the preceding and successive reflection waveforms in the analysis target frames.

Next, determiner 50 determines whether the rate of change in the preceding and successive reflection waveforms in the analysis target frames is higher than or equal to a predetermined threshold value (step S16). When the rate of change in the reflection waveforms is not higher than or equal to the predetermined threshold value (No in S16), determiner 50 determines that there is no significant change in the state of the hand and arm area, and does not change weight w applied to image information Ii to be input to third trained model M3. On the other hand, when the rate of change in the reflection waveforms is higher than or equal to the predetermined threshold value (Yes in S16), determiner 50 determines that a significant change has occurred in the state of the hand and arm area, and changes weight w applied to image information Ii to be input to third trained model M3.

When changing weight w applied to image information Ii, determiner 50 first determines whether current weight w applied to image information Ii is 1 (step S17). When current weight w is 1 (Yes in S17), determiner 50 determines that, for example, the hand of person P has gone around the back side of a member, such as a board, from the front side, and changes weight w applied to image information Ii to a value that is lower than 1 (step S18). On the other hand, when current weight w is not 1 (No in S17), determiner 50 determines that the hand of person P has come out from the back side of the member such as a board to the front side, and changes weight w applied to image information Ii to 1 that is the original value (step S19).

Work estimation device 4 then estimates the content of the work performed by person P using third trained model M3 based on weighted image information Ii and tool information It.

In Variation 4, the weight applied to image information Ii to be input to third trained model M3 is changed according to a change in the reflection waveforms of the reflected sound. With this, it is possible to reduce an incorrect estimation of the work area even when, for example, a board or the like that covers the hand of person P is present in front of the hand of person P. This reduces an incorrect estimation of the content of the work performed by person P.

[Variation 5 of Embodiment 1]

Work estimation system 1 according to Variation 5 of Embodiment 1 will be described. In Variation 5, an example will be described in which the emission frequency (the frequency of sound emission) of ultrasonic emitter 2 is changed according to whether there is a change in the work during a certain time period.

In a similar manner to Embodiment 1, work estimation device 4 according to Variation 5 includes data processor 5, communicator 80, and memory 90. Data processor 5 includes sound information obtainer 10, work area estimator 20, used tool estimator 30, work content estimator 40, and determiner 50.

Determiner 50 according to Variation 5 changes the emission frequency of the emission sound of ultrasonic emitter 2 according to information that indicates whether person P has been performing the same work for a certain time period, or information that indicates whether person P has stopped performing the work for a certain time period among information Io output from work content estimator 40.

Figure 23:
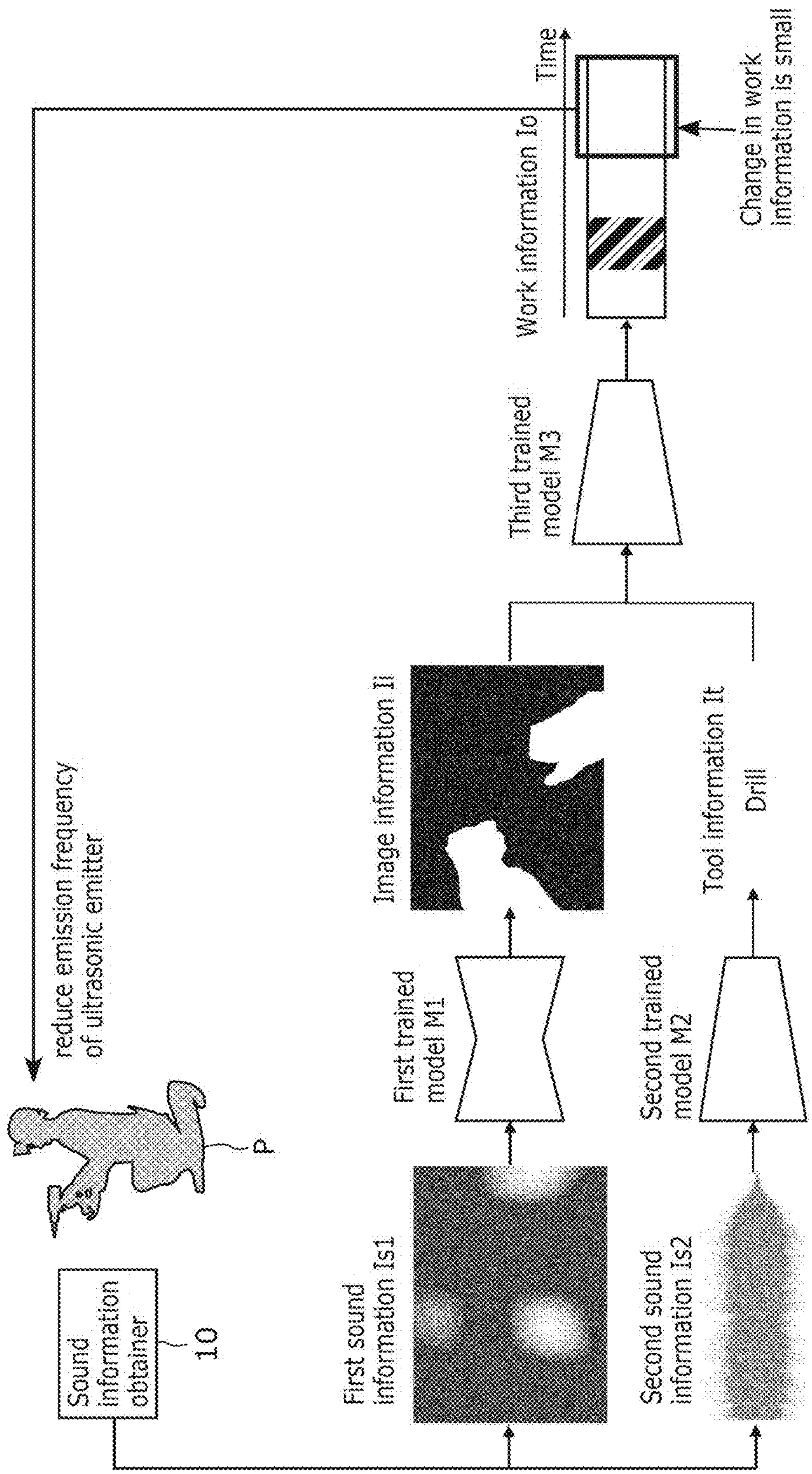
FIG. 23 illustrates inference models and the like used by a work estimation device according to Variation 5 of Embodiment 1.

FIG. 23 illustrates inference models and the like used by work estimation device 4 according to Variation 5 of Embodiment 1.

Work estimation device 4 outputs image information Ii by inputting first sound information Is1 to first trained model M1, outputs tool information It by inputting second sound information Is2 to second trained model M2, and outputs work information Io by inputting image information Ii and tool information It to third trained model M3.

When person P has been performing the same work for a certain time period or has stopped performing the work for a certain time period, work estimation device 4 outputs, to ultrasonic emitter 2, control information for reducing the emission frequency of sound based on the time series data of work information Io.

Figure 24:
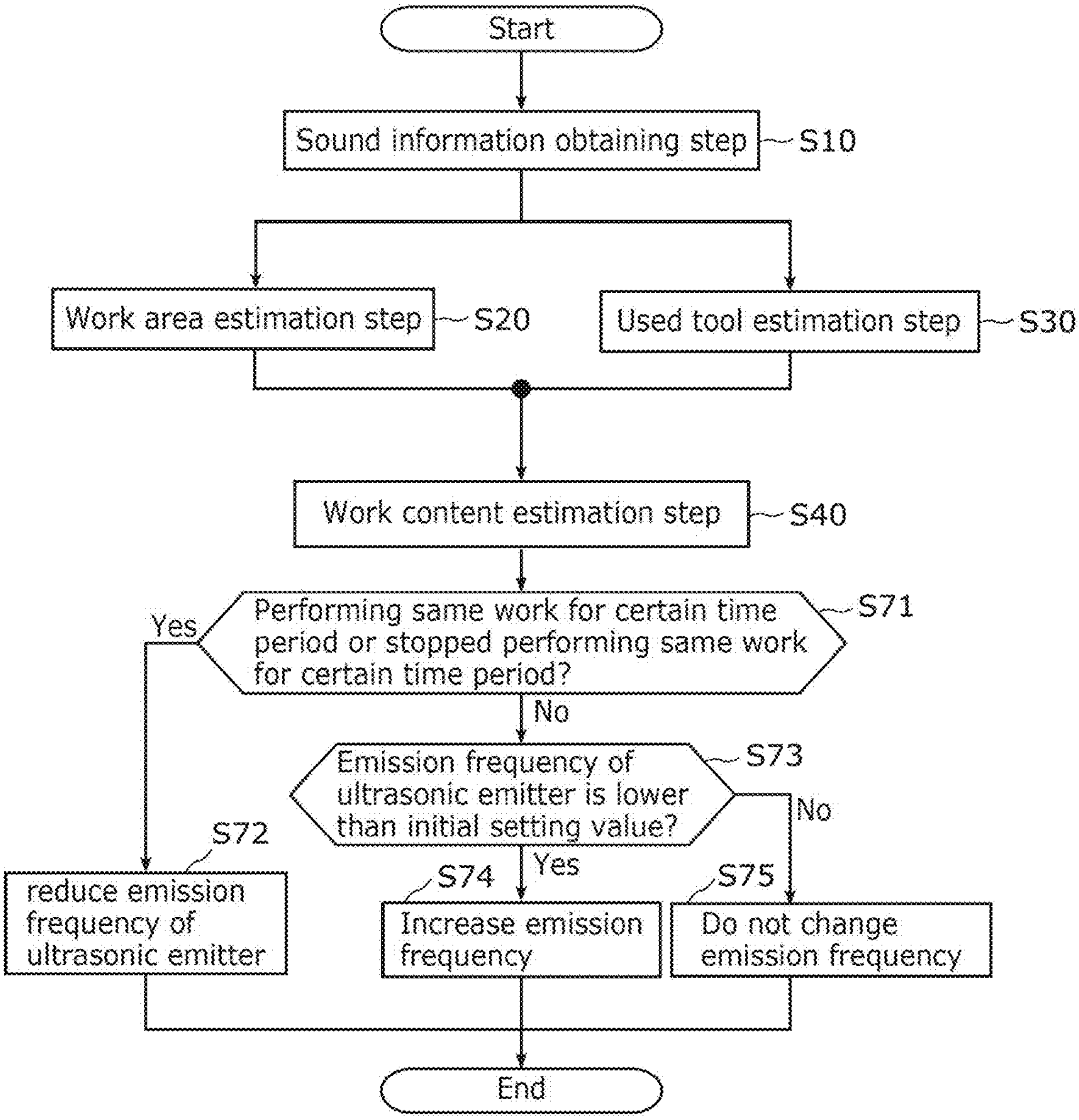
FIG. 24 is a flowchart of a work estimation method according to Variation 5 of Embodiment 1.

FIG. 24 is a flowchart of the work estimation method according to Variation 5 of Embodiment 1.

In a similar manner to Embodiment 1, the work estimation method according to Variation 5 includes sound information obtaining step S10, work area estimation step S20, used tool estimation step S30, and work content estimation step S40.

The work estimation method further includes a plurality of steps after work content estimation step S40.

In the work estimation method, after work content estimation step S40, determiner 50 determines whether or not person P has been performing the same work for a certain time period or whether person P has stopped performing the work for a certain time period (step S71) based on the time series data of work information Io output from work content estimator 40. When person P has been performing the same work for a certain time period or has stopped performing the work for a certain time period (Yes in S71), determiner 50 reduces the emission frequency of ultrasonic emitter 2 from the current frequency (step S72). On the other hand, when person P has not been performing the same work for a certain time period or has not stopped performing the work for a certain time period (No in S71), determiner 50 determines whether to change the emission frequency of ultrasonic emitter 2 from the current emission frequency.

First, determiner 50 determines whether the current emission frequency of ultrasonic emitter 2 is lower than an initial setting value (step S73). The initial setting value is, for example, 20 times per second. When the current emission frequency is lower than the initial setting value (Yes in S73), determiner 50 increases the emission frequency of ultrasonic emitter 2 from the current frequency (step S74) to change the current emission frequency back to the initial setting value. On the other hand, when the current emission frequency is not lower than the initial setting value (No in S73), determiner 50 determines not to change the emission frequency of ultrasonic emitter 2 (step S75).

In such a manner, in Variation 5, the emission frequency of ultrasonic emitter 2 is changed according to whether there is a change in the work during a certain time period. Specifically, in work estimation system 1, when person P has been performing the same work for a certain time period or has stopped performing the work for a certain time period, the emission frequency of ultrasonic emitter 2 is set to be lower than the current frequency. This reduces the power consumption of work estimation system 1. It is also possible to reduce the computational processing load in work estimation system 1.

[Variation 6 of Embodiment 1]

Variation 6 of Embodiment 1 will be described. In Variation 6, an example will be described in which health management of person P is performed based on work information Io output from work content estimator 40.

In a similar manner to Embodiment 1, work estimation device 4 according to Variation 6 includes data processor 5, communicator 80, and memory 90. Data processor 5 also includes sound information obtainer 10, work area estimator 20, used tool estimator 30, work content estimator 40, and determiner 50.

When determiner 50 according to Variation 6 determines, based on work information Io output from work content estimator 40, that person P is continuously performing the same work beyond a predetermined period, determiner 50 outputs a notification signal prompting person P to rest.

Figure 25:
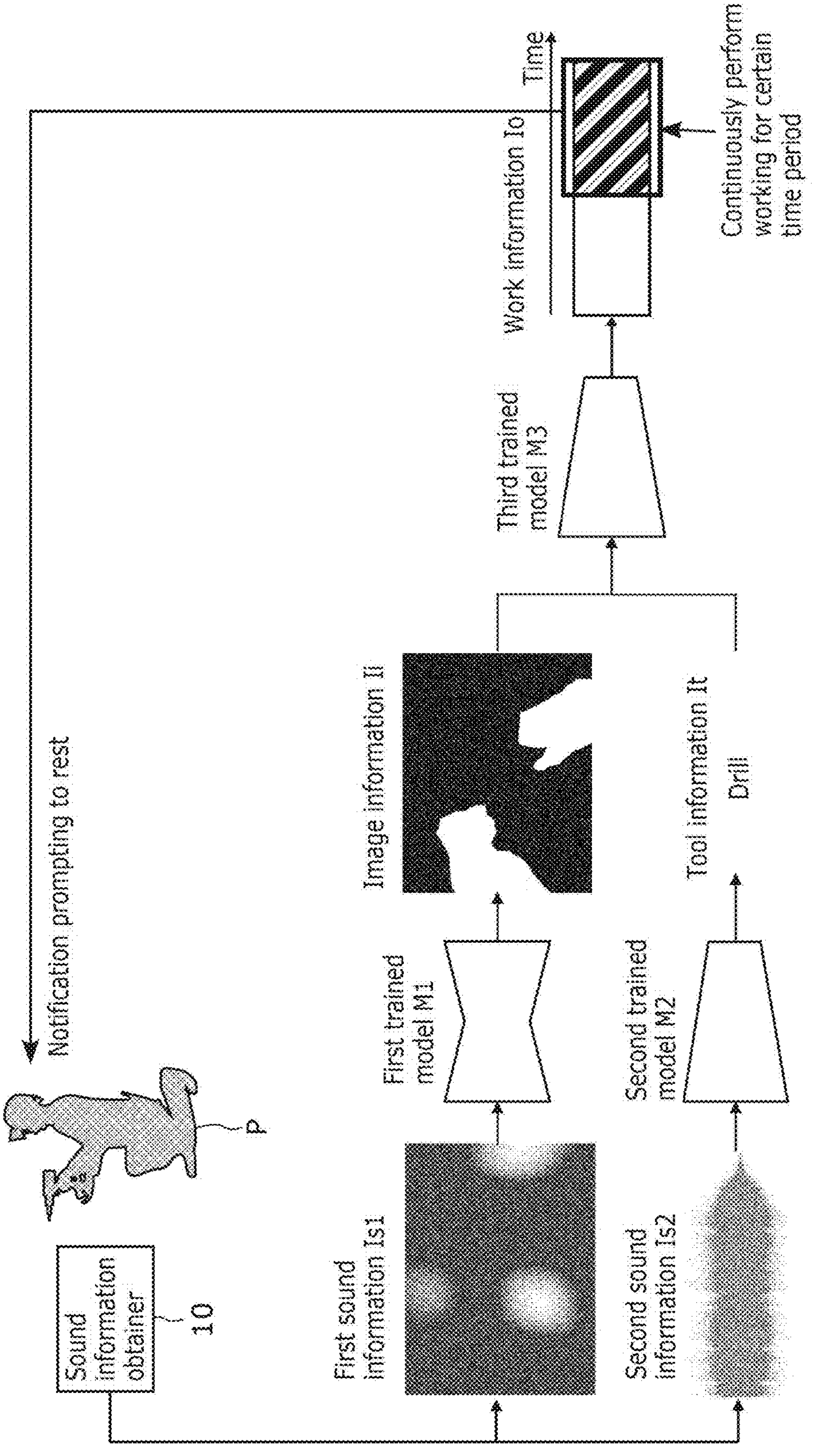
FIG. 25 illustrates inference models and the like used by a work estimation device according to Variation 6 of Embodiment 1.
Figure 26:
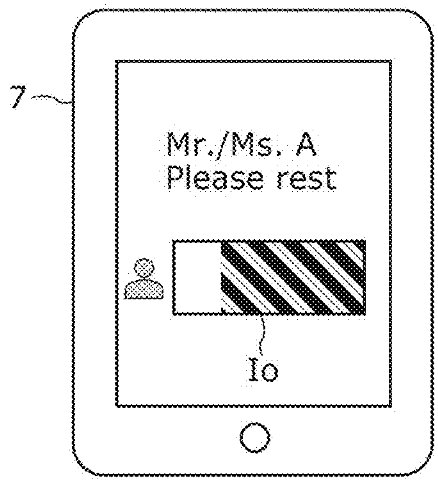
FIG. 26 illustrates an example of a screen displayed on an information terminal.

FIG. 25 illustrates inference models and the like used by work estimation device 4 according to Variation 6 of Embodiment 1. FIG. 26 illustrates an example of a screen displayed on information terminal 7.

Work estimation device 4 outputs image information Ii by inputting first sound information Is1 to first trained model M1, outputs tool information It by inputting second sound information Is2 to second trained model M2, and outputs work information Io by inputting image information Ii and tool information It to third trained model M3.

When person P has been performing the same work beyond a predetermined period, work estimation device 4 provides a notification prompting person P to rest. For example, as illustrated in FIG. 26, work estimation device 4 provides, via information terminal 7, a notification prompting person P who is performing work to rest.

Figure 27:
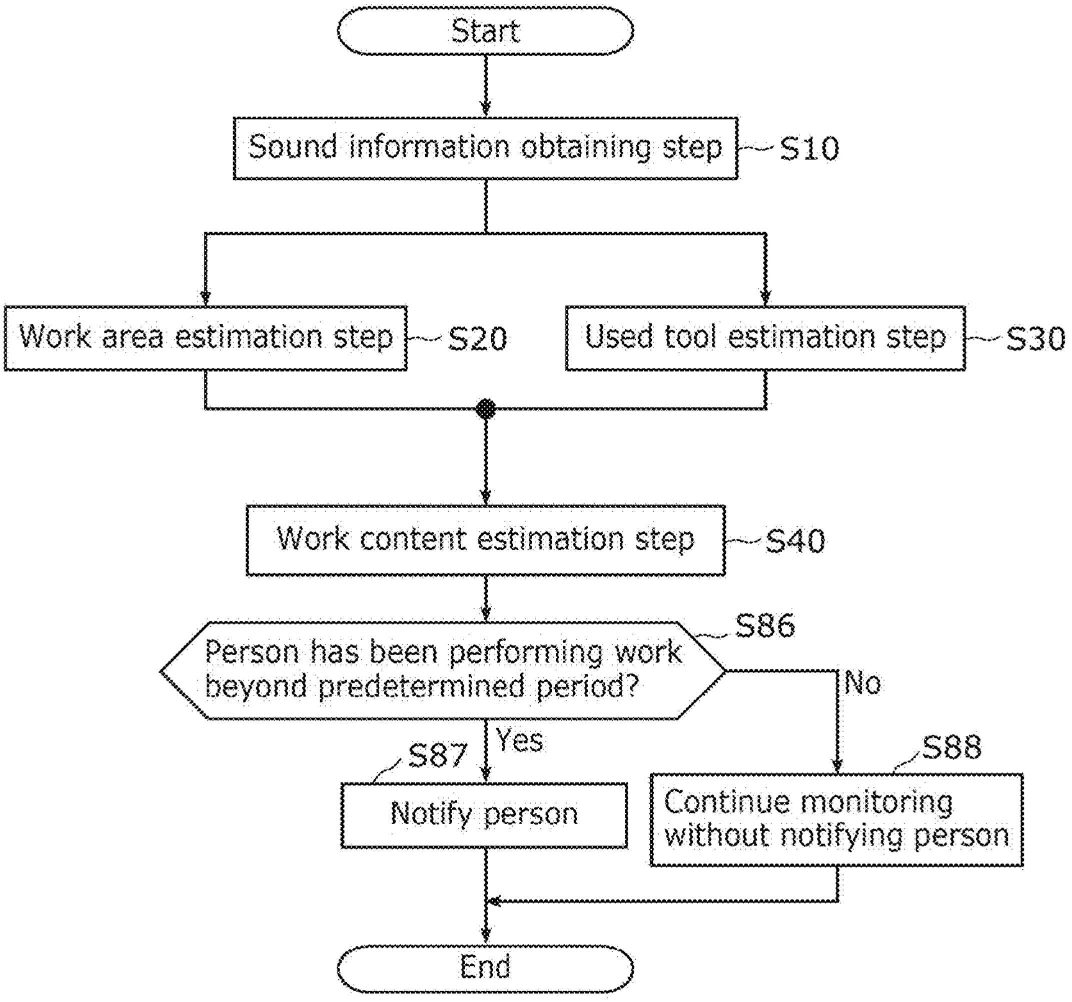
FIG. 27 is a flowchart of a work estimation method according to Variation 6 of Embodiment 1.

FIG. 27 is a flowchart of the work estimation method according to Variation 6 of Embodiment 1.

In a similar manner to Embodiment 1, the work estimation method according to Variation 6 includes sound information obtaining step S10, work area estimation step S20, used tool estimation step S30, and work content estimation step S40. The work estimation method further includes a plurality of steps after work content estimation step S40.

In the work estimation method, after work content estimation step S40, determiner 50 determines whether person P has been performing the same work beyond a predetermined period, based on the time series data of work information Io output from work content estimator 40 (step S86). When person P has been performing the same work beyond the predetermined period (Yes in S86), determiner 50 provides a notification prompting person P to rest (step S87). On the other hand, when person P has not been performing the same work beyond the predetermined period (No in S86), determiner 50 does not provide a notification to person P and continues monitoring the work performed by person P (step S88).

As in Variation 6, when it is determined that person P has been performing the same work beyond the predetermined period, health management of person P can be performed by providing a notification prompting person P to rest.

Embodiment 2

Work estimation system 1B according to Embodiment 2 will be described. In Embodiment 2, an example will be described in which management device 6 includes the functions of work estimation device 4 according to Embodiment 1.

Figure 28:
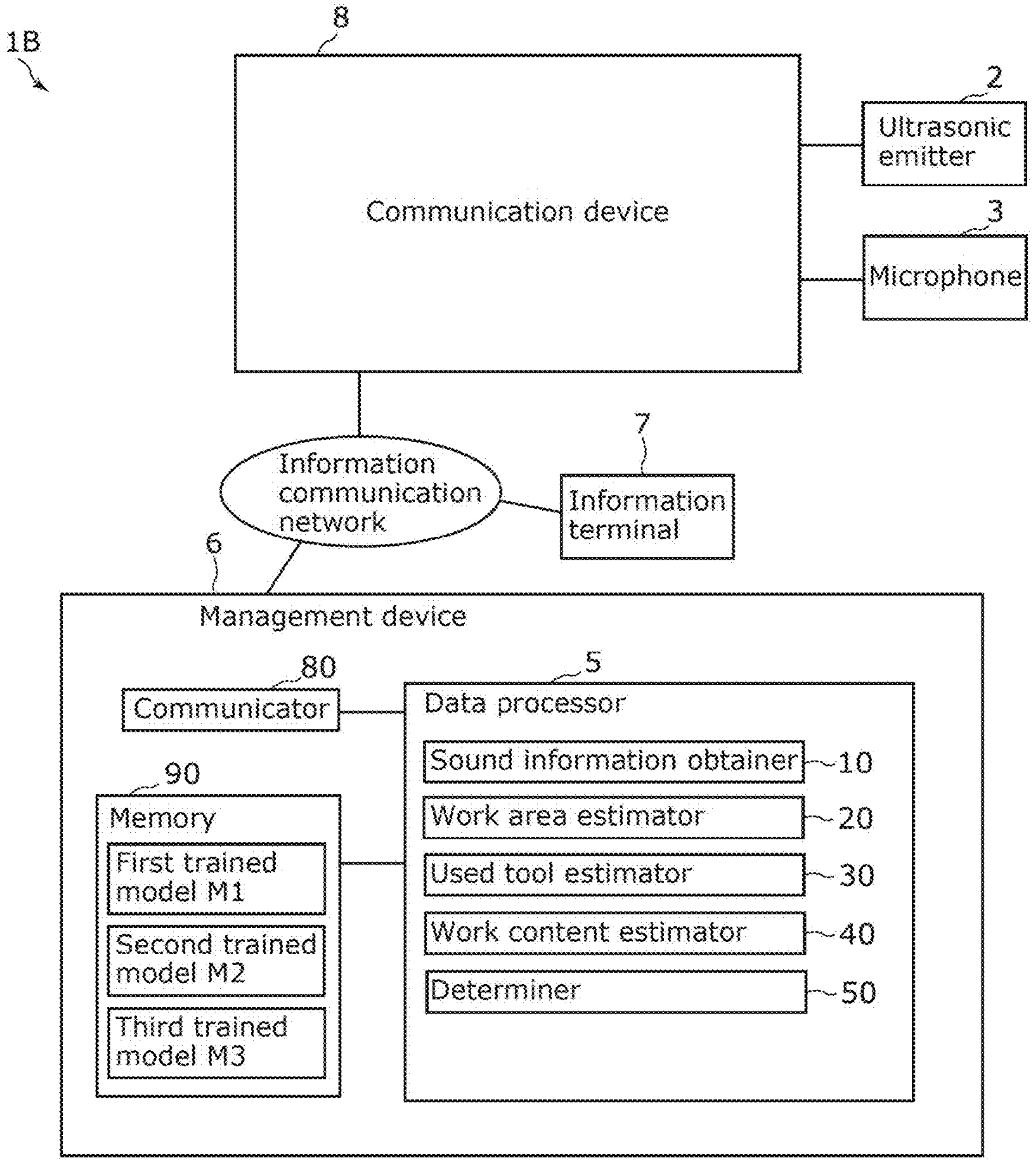
FIG. 28 is a block diagram illustrating a functional configuration of a work estimation system according to Embodiment 2.

FIG. 28 is a block diagram illustrating a functional configuration of work estimation system 1B according to Embodiment 2.

As illustrated in FIG. 28, work estimation system 1B includes ultrasonic emitter 2, microphone 3, communication device 8, and management device 6.

Management device 6 is provided outside the work site, and is communicatively connected to communication device 8 via an information communication network. Management device 6 is provided in the building of a management company that performs security management. Management device 6 according to Embodiment 2 includes the functions of work estimation device 4 according to Embodiment 1.

Ultrasonic emitter 2, microphone 3, and communication device 8 are provided on a hat or a helmet. Microphone 3 receives sound to generate a received sound signal, and outputs the received sound signal to work estimation device 8. Communication device 8 is a communication module that transmits the received sound signal to management device 6 via the information communication network.

Management device 6 receives the receive signal output from microphone 3 via communication device 8.

Management device 6 includes data processor 5 that processes data. Data processor 5 includes sound information obtainer 10, work area estimator 20, used tool estimator 30, work content estimator 40, and determiner 50. Management device 6 further includes communicator 80 and memory 90. Management device 6 is configured from a computer that includes a processor and the like. Each of the structural elements of management device 6 may be software functions executed, for example, by a processor executing a program recorded in memory 90.

Management device 6 receives the received signal output from microphone 3 via communication device 8, and performs the same data processing as in Embodiment 1 to estimate the content of the work performed by person P.

Work estimation system 1B according to Embodiment 2 is capable of estimating the content of the work performed by person P while protecting the privacy of the people at the work site.

Other Embodiments

The work estimation method and the like according to the embodiments of the present disclosure has been described. However, the present disclosure is not limited to the individual embodiments. Various modifications of the embodiment as well as embodiments resulting from arbitrary combinations of structural elements of the embodiments that may be conceived by those skilled in the art may be included in one or more aspects of the present disclosure as long as these do not depart from the essence of the present disclosure.

For example, when generating first trained model M1, information that includes the time difference data of direct and reflected waves is used as training sound information Ls1, so that a trained model can be generated which includes information not only on the arrival direction but also the depth direction (direction perpendicular to both vertical and horizontal directions) of the reflected sound. When first trained model M1 is a model trained as described above, first sound information Is1 including time difference data of direct and reflected waves may be input to first trained model M1, and inferred image information Ii including the time difference data of direct and reflected waves may be output.

For example, in work estimation device 4 according to Embodiment 1, work area estimator 20, used tool estimator 30, and work content estimator 40 are separate structural elements, but the functions of work area estimator 20, the functions of tool estimator 30, and the functions of work content estimator 40 may be realized by a single structural element.

For example, in Embodiment 1, an example has been described in which ultrasonic emitter 2 and microphone 3 are separate structural elements. However, the present disclosure is not limited to such an example, and ultrasonic emitter 2 and microphone 3 may be an integrated ultrasonic sensor.

Moreover, in the above embodiments, each structural element may be realized by executing a software program suitable for each structural element. Each of the structural elements may be realized by means of a program executing unit, such as a CPU or a processor, reading and executing the software program recorded on a recording medium such as a hard disk or a semiconductor memory.

Each structural element may be realized by hardware. Each structural element may be realized by a circuit (or integrated circuit). These circuits may form one circuit as a whole, or may be separate circuits. These circuits may be general-purpose circuits or dedicated circuits.

Some general and specific aspects according to the present disclosure may be implemented using a system, a device, a method, an integrated circuit, a computer program, or a computer-readable recording medium such as a CD-ROM, or any combination of systems, devices, methods, integrated circuits, computer programs, or computer-readable recording media.

For example, the present disclosure may be realized as a data processor or an information processing system according to the embodiment described above. The present disclosure may be realized as an information processing method executed by a computer such as the information processing system in the embodiment described above. The present disclosure may be realized as a program for causing the computer to execute such an information processing method, or a non-transitory computer-readable recording medium in which such a program is recorded.

INDUSTRIAL APPLICABILITY

The work estimation method according to the present disclosure can be widely used to estimate the content of the work performed by a person at a work site.

The invention claimed is:

1. A work estimation method that estimates a content of a work performed by a person, the work estimation method comprising:

obtaining first sound information and second sound information, the first sound information being related to a reflected sound that is a sound obtained by reflection, by a hand of the person, of an emission sound that is in an inaudible frequency range and emitted by an ultrasonic emitter provided on a head of the person, the second sound information being related to a work sound generated by the work performed by the person;

outputting image information that indicates a work area of the person, by inputting the first sound information obtained in the obtaining to a first trained model;

outputting tool information that indicates a tool that is being used by the person, by inputting the second sound information obtained in the obtaining to a second trained model; and outputting work information that indicates the content of the work, by inputting, to a third trained model, the image information output in the outputting of the image information and the tool information output in the outputting of the tool information.

2. The work estimation method according to claim 1, wherein:

the first trained model is trained using sound information related to the reflected sound and an image that indicates the work area of the person;

the second trained model is trained using sound information related to the work sound and tool information that indicates a tool that is possibly used in the work; and the third trained model is trained using the image information, the tool information, and a work content that indicates the content of the work.

3. The work estimation method according to claim 1, wherein:

the first sound information includes at least one of a signal waveform of a sound or an image that indicates an arrival direction of the sound; and the second sound information includes a spectrogram image that indicates a frequency of the sound and a power of the sound.

4. The work estimation method according to claim 1, wherein, in the outputting of the work information, the image information input to the third trained model includes a plurality of image frames.

5. The work estimation method according to claim 4, wherein, in the outputting of the work information, a total number of image frames to be input to the third trained model is determined based on a difference in a total number of pixels in the work area of the person between two image frames among the plurality of image frames, the two image frames being preceding and successive image frames in analysis target frames.

6. The work estimation method according to claim 4, further comprising:

selecting an image frame to be re-input to the third trained model from among the plurality of image frames, when the work information output in the outputting of the work information does not match any of the work information used when training the third trained model, wherein:

in the selecting, two or more image frames are selected, the two or more image frames having a difference in a total number of pixels in the work area of the person between two image frames among the plurality of image frames, the difference being lower than a predetermined threshold value, and the two image frames being preceding and successive image frames in analysis target frames; and in the outputting of the work information, the two or more image frames selected in the selecting are re-input to the third trained model to output the work information that is in accordance with the re-input.

7. The work estimation method according to claim 1, further comprising:

notifying the work information output in the outputting of the work information.

8. The work estimation method according to claim 7, further comprising:

displaying the work information notified in the notifying.

9. The work estimation method according to claim 1, wherein the outputting of the image information and the outputting of the tool information are executed when an output value of an acceleration sensor provided on the head of the person is lower than a predetermined threshold value.

10. The work estimation method according to claim 1, further comprising:

recording the work information output in the outputting of the work information, wherein, in the recording, when an output value of an acceleration sensor provided on the head of the person is higher than or equal to a predetermined threshold value, a time period during which the output value is higher than or equal to the predetermined threshold value is recorded as a non-work period.

11. The work estimation method according to claim 1, wherein the reflected sound is reflected at a predetermined distance or less from the head of the person.

12. The work estimation method according to claim 1, wherein the outputting of the work information includes changing a weight applied to the image information to be input to the third trained model according to a rate of change in preceding and successive reflection waveforms in analysis target frames among reflection waveforms of the reflected sound included in the first sound information.

13. The work estimation method according to claim 1, further comprising:

comparing reflection waveforms of the reflected sound included in the first sound information, wherein, when a determination is made in the comparing that a rate of change in preceding and successive reflection waveforms in analysis target frames is higher than or equal to a predetermined threshold value, the outputting of the work information includes setting a weight applied to the image information to be input to the third trained model to be lower than a weight applied to the tool information.

14. The work estimation method according to claim 1, further comprising:

changing an emission frequency of the emission sound in the inaudible frequency range according to information that indicates whether the person has been performing a same work for a certain time period or information that indicates whether the person has stopped performing the work for a certain time period among the work information output in the outputting of the work information.

15. The work estimation method according to claim 14, further comprising:

outputting control information to an emission device that emits the emission sound in the inaudible frequency range, when a determination is made based on the work information that the person has been performing the same work for the certain time period or the person has stopped performing the work for the certain time period, the control information being for reducing the emission frequency of the emission sound.

16. The work estimation method according to claim 1, comprising:

providing a notification that prompts the person to rest, when a determination is made based on the work information that the person has been performing a same work beyond a predetermined time period.

17. A non-transitory computer-readable recording medium having recorded thereon a computer program for causing a computer to execute the work estimation method according to claim 1.

18. A work estimation system for estimating a content of a work performed by a person, the work estimation system comprising:

a sound information obtainer configured to obtain first sound information and second sound information, the first sound information being related to a reflected sound that is a sound obtained by reflection, by a hand of the person, of an emission sound that is in an inaudible frequency range and emitted by an ultrasonic emitter provided on a head of the person, the second sound information being related to a work sound generated by the work performed by the person;

a work area estimator configured to output image information that indicates a work area of the person, by inputting the first sound information obtained by the sound information obtainer to a first trained model;

a used tool estimator configured to output tool information that indicates a tool that is being used by the person, by inputting the second sound information obtained by the sound information obtainer to a second trained model; and a work content estimator configured to output work information that indicates the content of the work, by inputting, to a third trained model, the image information output by the work area estimator and the tool information output by the used tool estimator.

19. The work estimation system according to claim 18, further comprising:

the ultrasonic emitter configured to emit the emission sound; and a microphone configured to receive the reflected sound.

* * * * *